United States Patent
Wakai et al.

(10) Patent No.: US 10,664,995 B2
(45) Date of Patent: May 26, 2020

(54) CAMERA PARAMETER CALCULATION APPARATUS, METHOD, AND RECORDING MEDIUM BASED ON AN ABSOLUTE VALUE OF CORRESPONDING PIXEL VALUES

(71) Applicant: Panasonic Intellectual Property Management Co., Ltd., Osaka (JP)

(72) Inventors: Nobuhiko Wakai, Osaka (JP); Kunio Nobori, Osaka (JP); Takeo Azuma, Kyoto (JP); Satoshi Sato, Kyoto (JP); Ayako Maruyama, Osaka (JP); Mikiya Nakata, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 16 days.

(21) Appl. No.: 15/687,761

(22) Filed: Aug. 28, 2017

(65) Prior Publication Data
US 2018/0068462 A1    Mar. 8, 2018

(30) Foreign Application Priority Data

Sep. 8, 2016    (JP) ................................. 2016-175919
Mar. 23, 2017    (JP) ................................. 2017-057505

(51) Int. Cl.
*G06T 7/80*    (2017.01)
*G01B 21/04*    (2006.01)
(Continued)

(52) U.S. Cl.
CPC ................ *G06T 7/80* (2017.01); *G01B 11/24* (2013.01); *G01B 21/042* (2013.01);
(Continued)

(58) Field of Classification Search
CPC .............................. G06T 7/85; H04N 13/239
See application file for complete search history.

(56) References Cited

U.S. PATENT DOCUMENTS

2008/0031514 A1    2/2008 Kakinami

FOREIGN PATENT DOCUMENTS

JP    6-323821    11/1994
JP    2006-090756    4/2006
(Continued)

OTHER PUBLICATIONS

Roger Y. Tsai, "A Versatile Camera Calibration Technique for High-Accuracy 3D Machine Vision Metrology Using Off-The-Shelf TV Cameras and Lenses", IEEE Journal of Robotics and Automation, vol. 3, No. 4, pp. 323-344, Aug. 4, 1987.
(Continued)

*Primary Examiner* — Y Lee
(74) *Attorney, Agent, or Firm* — Wenderoth, Lind & Ponack, L.L.P.

(57) ABSTRACT

Provided are: a point group obtainer that obtains three-dimensional point group data indicating three-dimensional locations of each of a plurality of three-dimensional points included in an imaging space of one or more cameras; a camera parameter calculator that (i) obtains corresponding points, for each of the plurality of three-dimensional points, in individual images captured using the one or more cameras, based on the three-dimensional point group data and an initial camera parameter of each camera, and (ii) calculates a camera parameter of each camera on the basis of the initial camera parameter of each camera and pixel values, included in the individual images, at the corresponding points; and a camera parameter outputter that outputs the calculated camera parameter of each camera.

6 Claims, 20 Drawing Sheets

(51) Int. Cl.
*G01B 11/24* (2006.01)
*H04N 13/246* (2018.01)
*H04N 13/239* (2018.01)
*H04N 5/232* (2006.01)

(52) U.S. Cl.
CPC ......... *H04N 13/239* (2018.05); *H04N 13/246* (2018.05); *G06T 2207/10024* (2013.01); *G06T 2207/30244* (2013.01); *H04N 5/23216* (2013.01)

(56) References Cited

FOREIGN PATENT DOCUMENTS

| JP | 2006-148745 | 6/2006 |
| JP | 2009-121824 | 6/2009 |
| JP | 2012-075060 | 4/2012 |
| JP | 2012-088114 | 5/2012 |

OTHER PUBLICATIONS

Zhengyou Zhang, "A Flexible New Technique for Camera Calibration", IEEE Transactions on Pattern Analysis and Machine Intelligence, vol. 22, pp. 1330-1334, Nov. 11, 2000.

CAMERA PARAMETER CALCULATION APPARATUS, METHOD, AND RECORDING MEDIUM BASED ON AN ABSOLUTE VALUE OF CORRESPONDING PIXEL VALUES

BACKGROUND

1. Technical Field

The present disclosure relates to a technique for calculating camera parameters.

2. Description of the Related Art

To calculate camera parameters, namely to calibrate a camera, it is necessary to associate three-dimensional coordinates in a three-dimensional space and pixel locations in a two-dimensional image. For this purpose, conventionally, three-dimensional coordinates and pixel locations in a two-dimensional image are associated by imaging a calibration index such as a checked pattern having a known shape and detecting intersecting points of the checked pattern (for example, see Japanese Patent No. 4681856, Japanese Patent No. 5580164, Roger Y. Tsai, "A Versatile Camera Calibration Technique for High-Accuracy 3D Machine Vision Metrology Using Off-The-Shelf TV Cameras and Lenses", IEEE Journal of Robotics and Automation, Vol. 3, pp. 323-344, 1987, and Zhengyou Zhang, "A Flexible New Technique for Camera Calibration", IEEE Transactions on Pattern Analysis and Machine Intelligence, Vol. 22, pp. 1330-1334, 2000).

SUMMARY

In conventional camera calibration, a calibration index having a known three-dimensional structure is used. A calibration index having high processing precision and a wide imaging space are therefore necessary. Furthermore, in this kind of calibration of a wide-angle camera, large-scale calibration equipment is necessary to arrange a calibration index across the entire field of view.

The present disclosure has been invented in light of the aforementioned problems, and the purpose thereof is to calibrate a single-lens camera and a stereo camera or multi-lens camera without using a calibration index having a known three-dimensional structure.

In one general aspect, the techniques disclosed here feature a camera parameter calculation apparatus that includes: a point group obtainer that obtains three-dimensional point group data indicating three-dimensional coordinates of a plurality of three-dimensional points included in a common imaging space of one or more cameras; a camera parameter calculator that (i) calculates image coordinates of corresponding points, for each of the plurality of three-dimensional points, in one or more images captured using the one or more cameras, based on the three-dimensional point group data and one or more initial camera parameters of the one or more cameras, and (ii) calculates one or more camera parameters of the one or more cameras, based on pixel values, included in the one or more images, at the image coordinates; and a camera parameter outputter that outputs the one or more camera parameters, in which the one or more cameras and the one or more initial camera parameters are in one-to-one relationship, the one or more cameras and the one or more images are in one-to-one relationship, and the one or more cameras and the one or more camera parameters are in one-to-one relationship.

According to the camera calibration technique of the present disclosure, camera parameters are evaluated based on pixel values at pixel coordinates obtained by projecting three-dimensional coordinates onto an image using the camera parameters, and thus camera parameters can be calculated, namely a camera can be calibrated, without using a calibration index having a known three-dimensional structure. A camera can therefore be calibrated without associating three-dimensional coordinates in a three-dimensional space and pixel locations in a two-dimensional image.

It should be noted that general or specific aspects hereof may be realized by an apparatus, a system, a method, an integrated circuit, a computer program, or a computer-readable recording medium, and may be realized by an arbitrary combination of an apparatus, a system, a method, an integrated circuit, a computer program, and a computer-readable recording medium. A computer-readable recording medium includes a nonvolatile recording medium such as a compact disc read-only memory (CD-ROM), for example.

Additional benefits and advantages of the aspects of the present disclosure will become apparent from the present specification and drawings. The benefits and/or advantages may be individually provided by the various aspects and features disclosed in the present specification and drawings, and need not all be necessary in order to obtain one or more of the same.

DETAILED DESCRIPTION (Findings Forming the Basis for the Present Disclosure)

The present inventor discovered that the following problems occur in relation to the camera calibration described in the Description of the Related Art section.

In order to calibrate a camera, it is necessary to associate three-dimensional coordinates of points of interest in a three-dimensional space in which the camera is present, and pixel locations (hereinafter, referred to as corresponding points) at which the points of interest are projected in a two-dimensional image obtained by imaging the three-dimensional space using the camera. For this purpose, conventionally, the three-dimensional coordinates and the pixel locations in the two-dimensional image are associated by imaging a calibration index such as a checked pattern having a known shape and detecting intersecting points of the checked patter. Here, the three-dimensional coordinates in the three-dimensional space are referred to as world coordinates, and the two-dimensional coordinates in the two-dimensional image are referred to as image coordinates.

Figure 26:
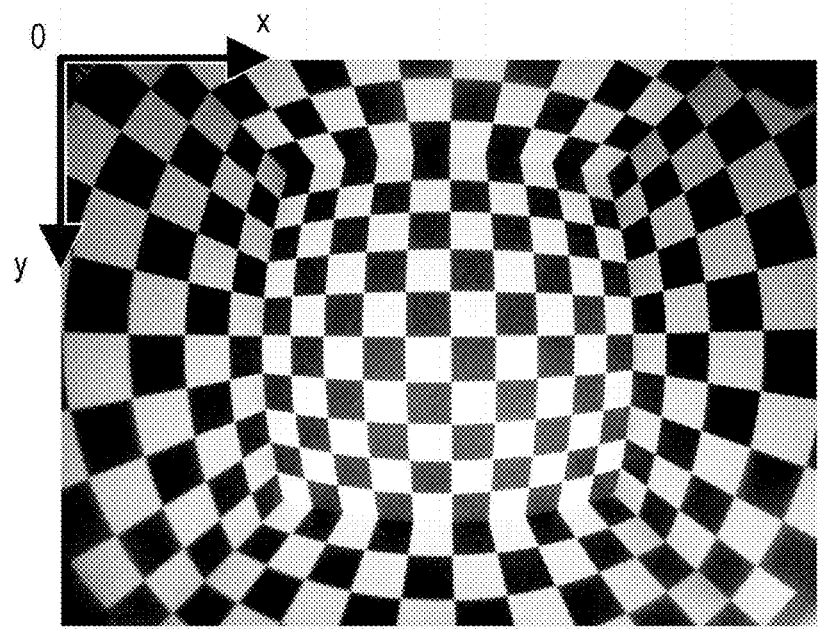
FIG. 26 is an image of a checked pattern captured by a fish-eye camera.

For example, FIG. 26 is a calibration index in which a checked pattern has been drawn at fixed intervals inside a box-shaped subject. For the pixel locations in a two-dimensional image, an operator reads in locations of intersecting points of an image coordinate system in which the top left of the image is the point of origin, as depicted in FIG. 26. Corresponding three-dimensional coordinates are obtained from the checked pattern used for imaging. Specifically, the three-dimensional coordinates can be identified by setting the point of origin and the three axes of X, Y, and Z for the world coordinates at specific locations, and determining which intersecting point of the checked pattern from the point of origin corresponds to an intersecting point of interest.

A point in the world coordinates can be projected onto image coordinates by a coordinate conversion that is based on camera parameters. In other words, calculated corresponding points on a camera image corresponding to points in the world coordinates can be obtained using camera parameters. Conversely, camera parameters can be calculated from a set of world coordinates (X, Y, Z) and image coordinates (x, y) that actually correspond. Using a pinhole camera as an example, a projection from world coordinates to image coordinates by means of camera parameters is indicated in expression 1.

$$h \begin{bmatrix} x_u \\ y_u \\ 1 \end{bmatrix} = \begin{bmatrix} 1/d'x & 0 & C_x \\ 0 & 1/d'y & C_y \\ 0 & 0 & 1 \end{bmatrix} \begin{bmatrix} f & 0 & 0 & 0 \\ 0 & f & 0 & 0 \\ 0 & 0 & 1 & 0 \end{bmatrix}$$
$$\begin{bmatrix} R_{11} & R_{12} & R_{13} & T_x \\ R_{21} & R_{22} & R_{23} & T_y \\ R_{31} & R_{32} & R_{33} & T_z \\ 0 & 0 & 0 & 1 \end{bmatrix} \begin{bmatrix} X \\ Y \\ Z \\ 1 \end{bmatrix}$$ (Expression 1)

For the camera parameters of this pinhole camera model, an x component and y component in the center of the image are taken as $C_x$ and $C_y$, a focal length is taken as f, lengths in the x and y directions of one pixel of an imaging element are respectively taken as $d'_x$ and $d'_y$, a three-row three-column rotation matrix for reference for the world coordinates of the camera is taken as R (the tens place of the bottom-right subscript represents the row and the ones place represents the column), x, y, and z components of a translation for reference for the world coordinates of the camera are respectively taken as $T_x$, $T_y$, and $T_z$, and a parameter having no degree of freedom is taken as h. Furthermore, distortion such as distortion aberration can be expressed by using $\Phi(xd, yd)$, which represents a conversion from image coordinates $(x_u, y_u)$ having no distortion to image coordinates (x, y) having distortion (expression 2).

$$\begin{bmatrix} x \\ y \end{bmatrix} = \Phi\left(\begin{bmatrix} x_u \\ y_u \end{bmatrix}\right)$$ (Expression 2)

A plurality of conventional camera calibration techniques and problems therewith will be described in turn.

In Roger Y. Tsai, "A Versatile Camera Calibration Technique for High-Accuracy 3D Machine Vision Metrology Using Off-The-Shelf TV Cameras and Lenses", IEEE Journal of Robotics and Automation, Vol. 3, pp. 323-344, 1987, with respect to sets of world coordinates and image coordinates, a camera is calibrated by minimizing the sum total of the distances (reprojection errors) between points at which the world coordinates are projected onto an image using camera parameters and the corresponding points on the image. It is therefore necessary for three-dimensional coordinates in a three-dimensional space and pixel locations in a two-dimensional image to be associated.

In Zhengyou Zhang, "A Flexible New Technique for Camera Calibration", IEEE Transactions on Pattern Analysis and Machine Intelligence, Vol. 22, pp. 1330-1334, 2000, calibration indexes are set up at a plurality of different depths and are captured by one camera. With respect to sets of image coordinates and world coordinates on planes thus obtained, the camera is calibrated by minimizing the sum total of the squares of the distances between points at which the world coordinates are projected onto an image using camera parameters and corresponding points on the image. It is therefore necessary for three-dimensional coordinates in a three-dimensional space and pixel locations in a two-dimensional image to be associated.

In Japanese Patent No. 4681856, information is input regarding calibration points on planes on which three-dimensional coordinates and pixel values in a two-dimensional image are associated across a plurality of frames. The camera parameters are decided in such a way that calibration points that are present on a plane in world coordinates and calibration points in image coordinates are subjected to a planar projective transformation. It is therefore necessary for three-dimensional coordinates in a three-dimensional space and pixel locations in a two-dimensional image to be associated.

In Japanese Patent No. 5580164, two sets of three-dimensional locations are obtained using a three-dimensional laser scanner and a stereo camera. These two sets of three-dimensional locations are associated, and the stereo camera is calibrated based on the three-dimensional locations of the three-dimensional laser scanner, which has greater distance measurement precision than the stereo camera. Manually associating the three-dimensional points is complex, and a dedicated calibration index is necessary in the case where this process is to be carried out automatically. Furthermore, in the case where an error is included in camera parameters in a small stereo camera having a short baseline length, the decline in distance measurement precision is large compared to a stereo camera having a long baseline length. Therefore, in the case where the baseline length is short compared to the subject distance, there is a possibility of there being erroneous correspondence with the three-dimensional locations of the three-dimensional laser scanner.

Stereo cameras are used for peripheral monitoring, driving support, and the like in mobile bodies such as cars and drones. A wide-angle camera is preferred for such purposes. A general stereo camera intended for such distance measurement requires calibration at the time of manufacturing. Furthermore, recalibration of the camera is necessary for distortion caused by changes due to aging and impacts.

Ordinarily, the calibration performed at the time of manufacturing and the recalibration are carried out using dedicated calibration equipment. A calibration index having a known three-dimensional structure is used in these calibrations. A calibration index having high processing precision and a wide imaging space are therefore necessary. Furthermore, in this kind of calibration of a wide-angle camera, large-scale calibration equipment is necessary to arrange a calibration index across the entire field of view.

The present disclosure has been invented in light of the aforementioned problems, and the purpose thereof is to calibrate various types of cameras without using a calibration index having a known three-dimensional structure.

A camera parameter calculation apparatus according to an aspect of the present disclosure includes: a point group obtainer that obtains three-dimensional point group data indicating three-dimensional coordinates of a plurality of three-dimensional points included in a common imaging space of one or more cameras; a camera parameter calculator that (i) calculates image coordinates of corresponding points, for each of the plurality of three-dimensional points, in one or more images captured using the one or more cameras, based on the three-dimensional point group data and one or more initial camera parameters of the one or more cameras, and (ii) calculates one or more camera parameters of the one or more cameras, based on pixel values, included in the one or more images, at the image coordinates; and a camera parameter outputter that outputs the one or more camera parameters, in which the one or more cameras and the one or more initial camera parameters are in one-to-one relationship, the one or more cameras and the one or more images are in one-to-one relationship, and the one or more cameras and the one or more camera parameters are in one-to-one relationship.

According to this configuration, camera parameters are evaluated based on pixel values at pixel coordinates obtained by projecting three-dimensional coordinates onto an image using the camera parameters, and thus the camera parameters can be calculated, namely a camera can be calibrated, without using a calibration index having a known three-dimensional structure. A camera can therefore be calibrated without associating three-dimensional coordinates in a three-dimensional space and pixel locations in a two-dimensional image.

Furthermore, calculation of the image coordinates may include the camera parameter calculator converting the plurality of three-dimensional coordinates into the image coordinates in the one or more images corresponding to the one or more cameras, based on the one or more initial camera parameters corresponding to the one or more cameras.

According to this configuration, the image coordinates can be calculated from the three-dimensional coordinates using a typical coordinate conversion procedure in which camera parameters corresponding to a camera model such as a pinhole camera model serve as a medium, for example.

Furthermore, the one or more cameras may include two cameras, the camera parameter calculator may calculate the one or more camera parameters on the basis of a plurality of differences, and each of the plurality of differences may be a difference between a pixel value at a corresponding point, for one three-dimensional point from among the plurality of three-dimensional points, in a first image captured by a first camera included in the two cameras, and a pixel value at a corresponding point, for the one three-dimensional point, in a second image captured by a second camera included in the two cameras. The difference may be an absolute value of the difference between the pixel values, or may be a square value of the difference between the pixel values.

According to this configuration, if the camera parameters are correct, one three-dimensional point is correctly projected onto the corresponding points in the individual images, and therefore the plurality of differences all approach 0. That is, the total of the plurality of differences being large means that errors in the corresponding points in the individual images are large, namely that errors in the camera parameters are large. Therefore, for example, an evaluation function defined by the total of the differences is introduced, and the camera parameters are updated in such a way that the evaluation function decreases, by means of a well-known procedure such as the gradient descent method. Thus, camera calibration can be carried out with reduced errors in the camera parameters.

Furthermore, the one or more cameras may be two or more cameras, the camera parameter calculator may calculate the one or more camera parameters on the basis of a plurality of differences, and each of the plurality of differences may be a difference between one pixel value from among pixel values at corresponding points, for one three-dimensional point from among the plurality of three-dimensional points, in individual images captured by the two or more cameras, and an average value for said pixel values. The difference may be an absolute value of the difference between the pixel values, or may be a square value of the difference between the pixel values.

According to this configuration, if the camera parameters are correct, one three-dimensional point is correctly projected onto the corresponding points in the individual images, and therefore the plurality of differences all approach 0. That is, the total of the plurality of differences being large means that errors in the corresponding points in the individual images are large, namely that errors in the camera parameters are large. Therefore, for example, an evaluation function defined by the total of the differences is introduced, and the camera parameters are updated in such a way that the evaluation function decreases, by means of a well-known procedure such as the gradient descent method. Thus, camera calibration can be carried out with reduced errors in the camera parameters.

Furthermore, the one or more cameras may be two or more cameras, and the camera parameter calculator may calculate the one or more camera parameters on the basis of a degree of similarity of pixel value patterns in neighboring pixels of the corresponding points, corresponding to the same three-dimensional point, in the individual images. Specifically, the camera parameter calculator may calculate the one or more camera parameters on the basis of a plurality of normalized cross-correlations, and each of the plurality of normalized cross-correlations may be a correlation between pixel values included in the vicinity of the corresponding points, for the one three-dimensional point from among the plurality of three-dimensional points, in the individual images captured by the two or more cameras.

According to this configuration, even in the case where there is a gain difference (overall luminance difference caused by an inconsistency in exposure) in the individual images, it is possible to eliminate the gain difference and know the magnitude of the errors in the corresponding points on the basis of the similarity between the pixel value patterns.

Furthermore, the camera parameter calculator may exclude, from calculation of the one or more camera parameters, a three-dimensional point at which a plurality of the corresponding points having a distance of separation that is equal to or less than a threshold value are obtained in at least any one image, from among the plurality of three-dimensional points.

In this configuration, the plurality of the corresponding points having a distance of separation that is equal to or less than a threshold value are corresponding points for a plurality of three-dimensional points that are present in a region extending in substantially one direction from a camera. Therefore, there is a possibility of a rear three-dimensional object being covered by a front three-dimensional object. Hence, when the camera parameters are calculated, three-dimensional points at which a plurality of corresponding points having a distance of separation that is equal to or less than a threshold value are obtained are excluded from the calculation of the camera parameters. Thus, pixel values of corresponding points that may indicate pixel values that are different from the original values can be excluded from the calculation of evaluation values, and evaluation values can be calculated with the effect of covering being eliminated.

Furthermore, the camera parameter calculator may calculate the one or more camera parameters from three-dimensional points having excluded therefrom one or more three-dimensional points at which a luminance gradient at a corresponding point of at least one image from among the one or more images is less than a threshold value, from among the plurality of three-dimensional points.

According to this configuration, camera parameters are calculated excluding three-dimensional points located in regions having a small luminance gradient in the camera images, and therefore the calculation amount can be reduced with calculations using three-dimensional points having little contribution to the evaluation values being omitted.

The three-dimensional point group data may indicate three-dimensional locations of the plurality of three-dimensional points on the basis of the reflection of measurement light emitted from a predetermined distance measurement viewpoint, and the camera parameter calculator may exclude, from calculation of the one or more camera parameters, two three-dimensional points, included in the plurality of three-dimensional points, with which the distance between the two three-dimensional points is greater than a threshold value and an angle formed by direction vectors of the measurement light toward the two three-dimensional points is less than a threshold value.

In this configuration, the two three-dimensional points are a gap region located at a boundary between objects or a region having considerable surface unevenness in the three-dimensional point group data, and gaps are liable to occur also in the pixel values of corresponding points in images. When the pixel values of corresponding points such as these are used in the calculation of evaluation values, there is concern that the convergence of the camera parameters will be caused to deteriorate due to the evaluation values changing too sharply for errors in the corresponding points. For this kind of problem, in the aforementioned configuration, boundaries between objects and regions having considerable surface unevenness can be avoided, and evaluation values can be calculated using pixel values of appropriate regions.

Furthermore, the three-dimensional point group data may indicate three-dimensional locations of the plurality of three-dimensional points and intensity values of return light of measurement light from each three-dimensional point, based on the reflection of the measurement light emitted from a predetermined distance measurement viewpoint, and the camera parameter calculator may calculate the one or more camera parameters using only a plurality of three-dimensional points that are visible within a predetermined vicinity from the distance measurement viewpoint and have a difference between the intensity values that is within a range decided using a first threshold value and a second threshold value, from among the plurality of three-dimensional points.

According to this configuration, the camera parameters can be calculated using only a plurality of three-dimensional points that are within a range in which the intensity of measurement light, namely the reflectance of an object, changes in a smooth manner. For example, in regions in which there is a gap in the reflectance of objects due to a boundary between objects or the like, gaps are liable to occur also in the pixel values of the corresponding points in images. When the pixel values of corresponding points such as these are used in the calculation of evaluation values, there is concern that the convergence of the camera parameters will be caused to deteriorate due to the evaluation values changing too sharply for errors in the corresponding points. For this kind of problem, in the aforementioned configuration, regions in which there is an excessive difference in the reflectance of an object can be avoided, and evaluation values can be calculated using pixel values of appropriate regions. Furthermore, regions in which changes in reflectance occur excessively, such as uniform continuous surfaces, for example, are also excluded from the calculation of evaluation values as such regions hinder convergence of the camera parameters.

Furthermore, the three-dimensional point group data may be data obtained by measuring distances of the plurality of three-dimensional points using a three-dimensional laser scanner.

According to this configuration, the three-dimensional point group data can be obtained from a three-dimensional laser scanner that is generally easy to use.

Furthermore, the three-dimensional point group data may indicate three-dimensional locations of the plurality of three-dimensional points and the color of an object at each three-dimensional point, based on the reflection of measurement light emitted from a predetermined distance measurement viewpoint and color imaging from the distance measurement viewpoint, and the camera parameter calculator may calculate the one or more camera parameters using only a plurality of three-dimensional points that are visible within a predetermined vicinity from the distance measurement viewpoint and have a difference between the colors of the objects that is within a range decided using a first threshold value and a second threshold value, from among the plurality of three-dimensional points.

According to this configuration, the camera parameters can be calculated using only a plurality of three-dimensional points within a range in which the color of an object changes in a smooth manner. For example, in regions in which there is a gap in the colors of objects due to a boundary between objects or the like, gaps occur also in the colors of the corresponding points in the images. When the pixel values of corresponding points such as these are used in the calculation of evaluation values, there is concern that the convergence of the camera parameters will be caused to deteriorate due to the evaluation values changing too sharply for errors in the corresponding points. For this kind of problem, in the aforementioned configuration, regions in which there is an excessive difference in the colors of objects can be avoided, and evaluation values can be calculated using pixel values of appropriate regions. Furthermore, for example, regions in which changes in color occur excessively, such as uniform continuous surfaces, are also excluded from the calculation of evaluation values as such regions hinder convergence of the camera parameters.

Furthermore, the three-dimensional point group data may indicate three-dimensional locations of the plurality of three-dimensional points and the color of an object at each three-dimensional point, based on the reflection of measurement light emitted from a predetermined distance measurement viewpoint and color imaging from the distance measurement viewpoint, each of the one or more cameras may be a color camera, and the camera parameter calculator may calculate a camera parameter of one camera from among the one or more cameras on the basis of a plurality of differences, and the plurality of differences may be differences between a color indicated by a pixel value at a corresponding point, for one three-dimensional point from among the plurality of three-dimensional points, in an image captured by the one camera, and the color of the object at the one three-dimensional point indicated by the three-dimensional point group data.

According to this configuration, by using information regarding the color of an object indicated by the three-dimensional point group data, a single camera can be calibrated and a plurality of cameras can be calibrated one at a time.

Furthermore, the point group obtainer may obtain the three-dimensional point group data from a three-dimensional laser scanner provided with a color camera that color-images a distance measurement space.

According to this configuration, the three-dimensional point group data can be obtained together with color information from a three-dimensional laser scanner.

It should be noted that general or specific aspects hereof may be realized by a system, a method, an integrated circuit, a computer program, or a recording medium such as a computer-readable CD-ROM, and may be realized by an arbitrary combination of a system, a method, an integrated circuit, a computer program, and a recording medium.

Embodiment 1

Hereinafter, an embodiment of the present disclosure will be described with reference to the drawings. The present disclosure can be implemented in one or more cameras; however, to simplify the description, here, the present disclosure will be described using the example of a stereo camera consisting of a left camera and a right camera.

Figure 1:
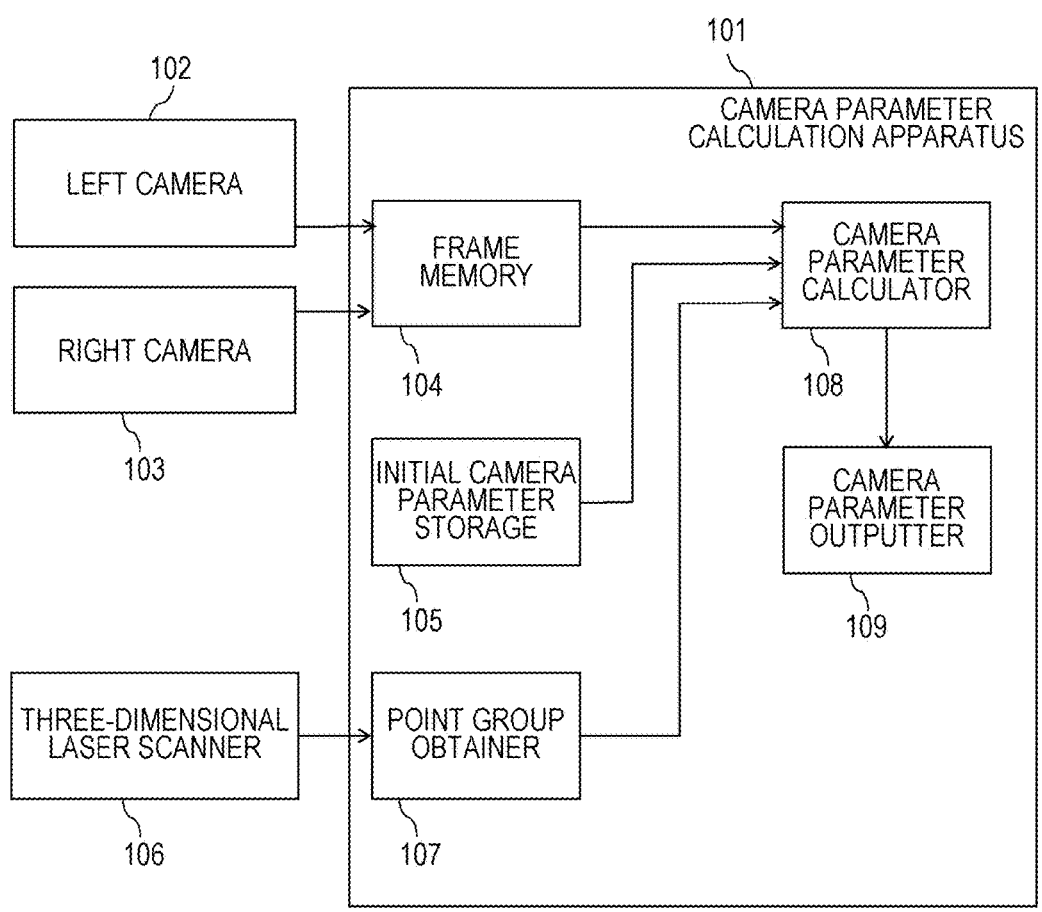
FIG. 1 is a block diagram depicting an example of a configuration of a camera parameter calculation apparatus according to embodiment 1.

FIG. 1 is a block diagram depicting an example of a functional configuration of a camera parameter calculation apparatus of embodiment 1. In FIG. 1, a camera parameter calculation apparatus 101 includes a frame memory 104, an initial camera parameter storage 105, a point group obtainer 107, a camera parameter calculator 108, and a camera parameter outputter 109. The camera parameter calculation apparatus 101 calibrates a left camera 102 and a right camera 103 using a three-dimensional laser scanner 106. It should be noted that calibrating a camera in the present specification means obtaining the camera parameters of an actual camera. Consequently, the camera parameter calculation apparatus of the present specification is synonymous with a camera calibration apparatus.

The operations of each constituent element depicted in FIG. 1 will be described hereinafter.

The left camera 102 captures a first space that is an imaging space, and sends a captured first image to the frame memory 104.

The right camera 103 captures a second space that is an imaging space, and sends a captured second image to the frame memory 104. The first space and the second space include a third space that is a common space. The third space may include one or more objects and/or one or more organisms. A subject that can be approximated by means of Lambertian reflectance is preferred from the standpoint that the way the surface of the subject appears (the color at a certain point) according to the camera location does not change.

The frame memory 104 receives and stores the first image and the second image.

The initial camera parameter storage 105 retains initial camera parameters in advance. The initial camera parameters may be the camera parameters included in expression 1, for example, or may be design values that are set and/or used when setting the stereo camera. Alternatively, in accordance with the schemes and the like according to the aforementioned Tsai (Roger Y. Tsai, "A Versatile Camera Calibration Technique for High-Accuracy 3D Machine Vision Metrology Using Off-The-Shelf TV Cameras and Lenses", IEEE Journal of Robotics and Automation, Vol. 3, pp. 323-344, 1987) and Zhang (Zhengyou Zhang, "A Flexible New Technique for Camera Calibration", IEEE Transactions on Pattern Analysis and Machine Intelligence, Vol. 22, pp. 1330-1334, 2000), the camera parameters may be estimated with rough precision by obtaining sets of world coordinates and image coordinates having a corresponding relationship, by manual operation a necessary number of times using a calibration index. Here, in the scheme according to Tsai, at least 13 sets of world coordinates and image coordinates are necessary. Furthermore, in the scheme according to Zhang, imaging carried out at least three times and at least 13 sets of world coordinates and image coordinates are necessary.

The three-dimensional laser scanner 106 scans a space that includes the aforementioned third space with laser light, and measures the three-dimensional locations of each of a plurality of points included in the space that includes the third space, in other words, a plurality of three-dimensional points. Data in which these measured three-dimensional locations of N points are represented by world coordinates (X, Y, Z) is referred to as three-dimensional point group data. The three-dimensional laser scanner 106 sends three-dimensional point group data to the point group obtainer 107.

The point group obtainer 107 receives the three-dimensional point group data from the three-dimensional laser scanner 106.

Figure 2:
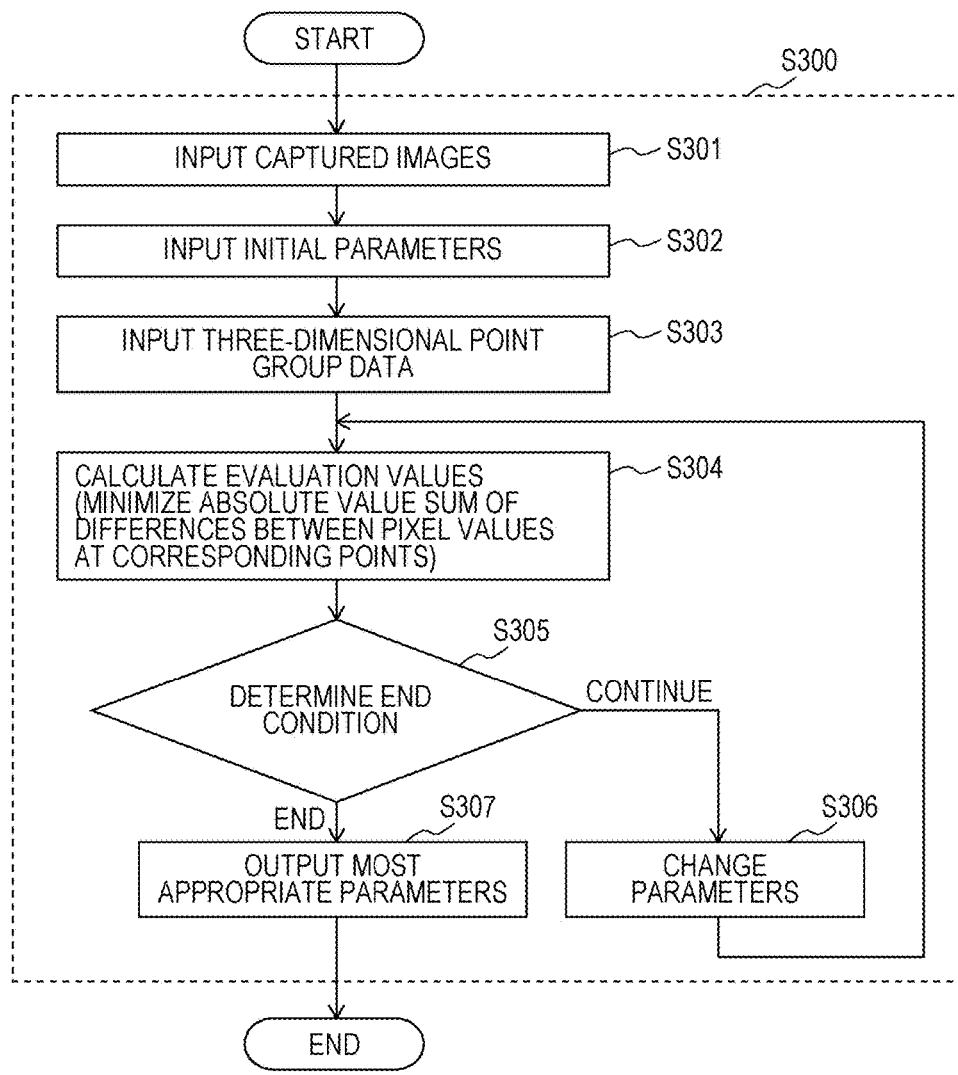
FIG. 2 is a flowchart depicting an example of an operation of the camera parameter calculation apparatus according to embodiment 1.

The camera parameter calculator 108 receives the first image and the second image from the frame memory 104, the initial camera parameters from the initial camera parameter storage 105, and the three-dimensional point group from the point group obtainer 107, and obtains camera parameters by means of the procedure depicted in FIG. 2.

The camera parameter outputter 109 outputs the camera parameters calculated by the camera parameter calculator 108.

The camera parameter calculation apparatus 101 may be realized by means of a computer apparatus (not depicted) consisting of a processor, a memory, an interface circuit, and the like, and the constituent elements of the camera parameter calculation apparatus 101 may be software functions achieved by the processor executing a program recorded in the memory in advance. Furthermore, the camera parameter calculation apparatus 101 may be realized by means of a dedicated hardware circuit that carries out the aforementioned operation.

Furthermore, the camera parameter calculation apparatus 101 does not necessarily have to be realized by means of a single computer apparatus, and may be realized by means of a distributed processing system (not depicted) that includes a terminal apparatus and a server. As an example, the frame memory 104, the initial camera parameter storage 105, the point group obtainer 107, and the camera parameter outputter 109 may be provided in the terminal apparatus, and the functions of some or all of the camera parameter calculator 108 may be executed by the server. In this case, the transfer of data among the constituent elements is carried out via a communication line connected to the terminal apparatus and the server.

FIG. 2 is a flowchart depicting an example of camera parameter calculation processing S300.

The camera parameter calculator 108 receives the first image captured by the left camera 102 stored in the frame memory 104, and the second image captured by the right camera 103 stored in the frame memory 104 (S301). Hereinafter, images captured by the cameras and received from the cameras are also referred to as captured images or camera images.

The camera parameter calculator 108 obtains initial camera parameters of each of the left camera 102 and the right camera 103 from the initial camera parameter storage 105 (S302).

The point group obtainer 107 receives three-dimensional point group data measured by the three-dimensional laser scanner 106, the point group obtainer 107 sends the three-dimensional point group data to the camera parameter calculator 108, and the camera parameter calculator 108 receives the three-dimensional point group data (S303).

The camera parameter calculator 108 calculates image coordinates $(x_{Lk}, y_{Lk})$ and $(x_{Rk}, y_{Rk})$ by means of expressions 1 and 2 from the world coordinates (X, Y, Z). $(x_{Lk}, y_{Lk})$ are image coordinates of the $k^{th}$ corresponding point included in the first image corresponding to the $k^{th}$ three-dimensional point, and $(x_{Rk}, y_{Rk})$ are image coordinates of the $k^{th}$ corresponding point included in the second image corresponding to the $k^{th}$ three-dimensional point.

An evaluation function J (expression 3) is calculated (S304); the evaluation function J is defined by the absolute value sum of the differences between the pixel value of a point included in the first image corresponding to the $k^{th}$ three-dimensional point included in the plurality of three-dimensional points obtained by the three-dimensional laser scanner 106, namely the $k^{th}$ corresponding point included in the first image corresponding to the $k^{th}$ three-dimensional point, and the pixel value of a point included in the second image corresponding to the $k^{th}$ three-dimensional point, namely the $k^{th}$ corresponding point included in the second image corresponding to the $k^{th}$ three-dimensional point.

$$J = \frac{1}{N}\sum_{k=1}^{N}|I_L(x_{Lk}, y_{Lk}) - I_R(x_{Rk}, y_{Rk})| \quad \text{(Expression 3)}$$

Here, N is the number of three-dimensional points at which pixel values are compared, and all or some of the points obtained by the three-dimensional laser scanner are selected. "Some . . . are selected" may mean that regions which have the same values due to continuous pixel values in the images and which do not affect the calculation of an evaluation value J are excluded, for example.

$I_L(x, y)$ is a pixel value at the image coordinates (x, y) of the first image, and $I_R(x, y)$ is a pixel value at the image coordinates (x, y) of the second image. The pixel values are luminance values in the case where the first image and the second image are monochrome images, and the pixel values are color vectors in the case where the first image and the second image are color images. It should be noted that the absolute value of the difference between color vectors means the distance between color vectors. In order to eliminate the effect of chromatic aberration, only the components of one specific color may be used from among the color components making up a color vector.

Each of the plurality of three-dimensional points included in the three-dimensional point group data is projected onto the first image using the camera parameters of the left camera 102, and is projected onto the second image using the camera parameters of the right camera 103.

Here, projecting refers to obtaining calculated corresponding points in camera images corresponding to a three-dimensional point, specifically, calculating image coordinates in the first image by carrying out a coordinate conversion based on the camera parameters of the left camera 102, and calculating image coordinates in the second image by carrying out a coordinate conversion based on the camera parameters of the right camera 103, with respect to each of the world coordinates for a plurality of three-dimensional points included in the three-dimensional point group data. For the coordinate conversions, projections based on the matrix calculation described by expression 1 may be used, for example. The image coordinates may be calculated with sub-pixel precision, and for pixel coordinates at this sub-pixel precision, pixel values may be calculated with decimal precision from an interpolation calculation such as a bilinear or bicubic interpolation calculation.

Furthermore, for the addition of the N points in the calculation of an evaluation value J, a weighting may be applied to the absolute value of the difference between pixel values. For example, a weighting for a point group in which the color of the subject continuously changes is made heavier, or a weighting for a point group in which the surface of an object is considerably uneven is made lighter. These weightings make changes in the evaluation values J smooth and facilitate minimization of the evaluation values J with respect to continuous changes in camera parameters.

In the case where the calculation of evaluation values J within a search range for the camera parameters is completed or an evaluation value J is smaller than a threshold value, the iterative calculation ends (end in S305). However, in the case where the iterative calculation is to continue (continue in step S305), the camera parameters are changed within the search range (S306). A range in which each camera parameter can be obtained is set in advance as the search range for the camera parameters. For example, it is sufficient for the image center location $C_x$, $C_y$, the focal length f, and the imaging element length $d'_x$, $d'_y$ to each be ±5% of the design values. Furthermore, for rotation components $R_x$, $R_y$, and $R_z$ of the camera location and translational movement components $T_x$, $T_y$, and $T_z$, it is sufficient for the positional relationship between the three-dimensional laser scanner 106 and the cameras 102 and 103 to be measured using a scale or the like, and for the angle to be ±10 degrees of the measurement value and the translational movement to be ±0.2 m.

It should be noted that in order to reduce the calculation time for the repeated processing in steps S304 to S306, the range may be limited to the vicinity of the initial camera parameters, and the steepest descent method or the like may be applied using the gradient of the evaluation function.

Lastly, camera parameters having the lowest evaluation values are selected from sets of camera parameters and evaluation values calculated by means of the iterative calculation of the aforementioned steps S304 to S306, and the selected camera parameters are output (S307).

It being possible to calibrate a camera in accordance with this kind of procedure will be described in steps. In the evaluation function for calibrating a camera, it is necessary for the evaluation value to be the smallest at the correct camera parameter. Due to this property of the evaluation function, the evaluation value is minimized, and it thereby becomes possible to search for the correct camera parameter.

From all of the correct camera parameters, the value of only one camera parameter is changed. At such time, if the evaluation value J has a downward-convex function form with which the correct camera parameter is minimized for all of the camera parameters, the evaluation function J is downwardly convex with respect to all of the camera parameters. Here, calculating an extreme value with only one camera parameter λ being changed corresponds to a partial derivative ∂J/∂λ, and all partial derivatives becoming 0 at a certain point corresponds to a total derivative dJ/dΩ of the entire function being 0 (expression 4).

$$\frac{dJ}{d\Omega} = \frac{\partial J}{\partial \lambda_1}\frac{\partial \lambda_1}{\partial \Omega} + \frac{\partial J}{\partial \lambda_2}\frac{\partial \lambda_2}{\partial \Omega} + \cdots + \frac{\partial J}{\partial \lambda_m}\frac{\partial \lambda_m}{\partial \Omega} = 0 \quad \text{(Expression 4)}$$

Here, m represents the number of camera parameters, $\lambda_1$ to $\lambda_m$ represent individual camera parameters for focal length and the like, and Ω represents the entirety of the camera parameters in which the individual camera parameters are combined.

Since camera parameters are different according to the camera model, an example will be described using the 10 camera parameters used in the scheme of Tsai given in Roger Y. Tsai, "A Versatile Camera Calibration Technique for High-Accuracy 3D Machine Vision Metrology Using Off-The-Shelf TV Cameras and Lenses", IEEE Journal of Robotics and Automation, Vol. 3, pp. 323-344, 1987. For the camera parameters of this pinhole camera model, the x component and y component in the center of an image are taken as $C_x$ and $C_y$, the focal length is taken as f, the length in the x direction of one imaging element is taken as $d'_x$, the x, y, and z components of rotation for reference for the world coordinates of the camera are respectively taken as $R_x$, $R_y$, and $R_z$, and the x, y, and z components of a translation for reference for the world coordinates of the camera are respectively taken as $T_x$, $T_y$, and $T_z$. At such time, the evaluation value J becomes a function in which these 10 camera parameters are variables.

The present scheme can be carried out by imaging an actual space, and can be carried out using CG data. Hereinafter, camera calibration carried out using CG data will be described as an example.

Figure 3:
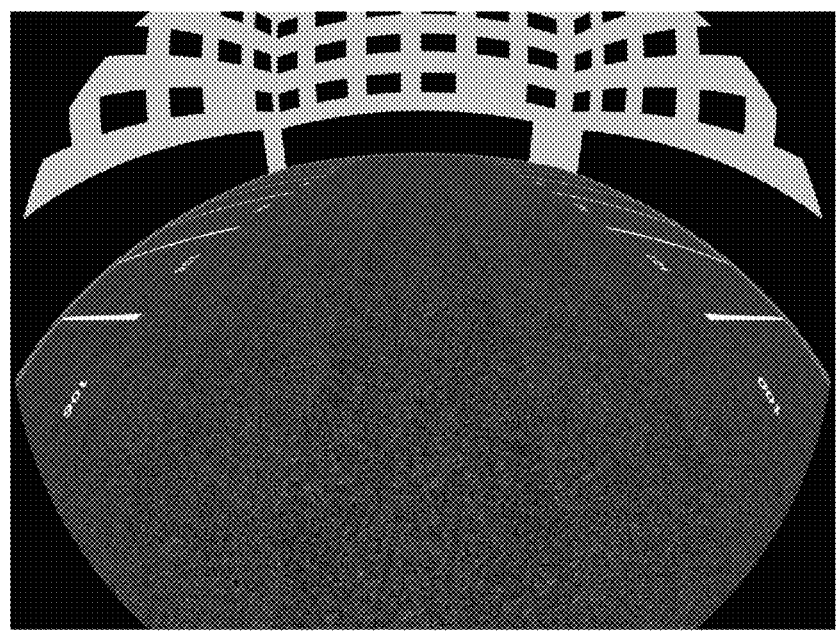
FIG. 3 is a drawing depicting an example of a computer graphics (CG) image according to embodiment 1.
Figure 4:
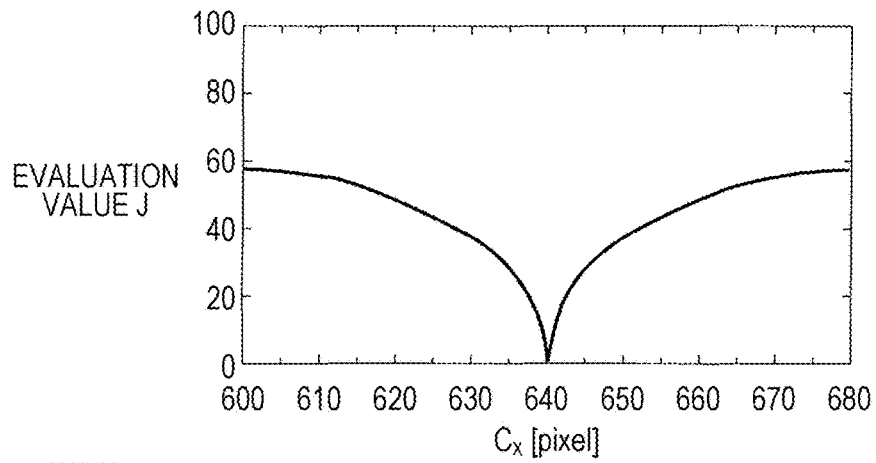
FIG. 4 is a drawing depicting evaluation values in the vicinity of a correct camera parameter for $C_x$.
Figure 5:
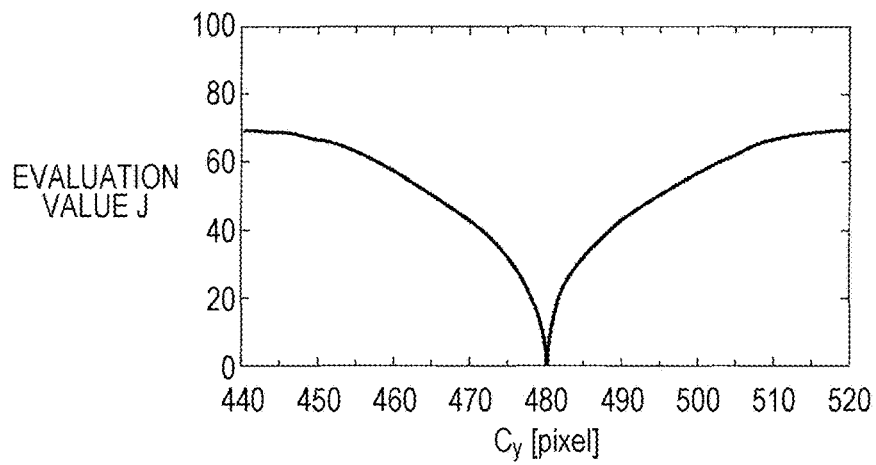
FIG. 5 is a drawing depicting evaluation values in the vicinity of a correct camera parameter for $C_y$.
Figure 6:
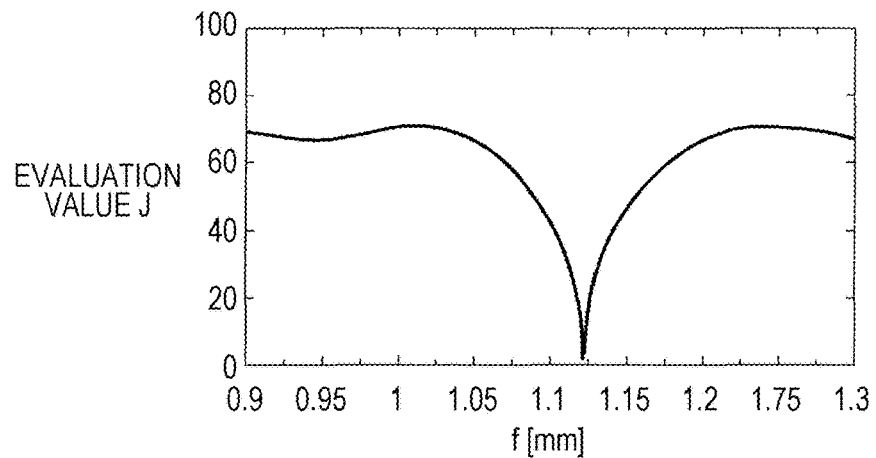
FIG. 6 is a drawing depicting evaluation values in the vicinity of a correct camera parameter for f.
Figure 7:
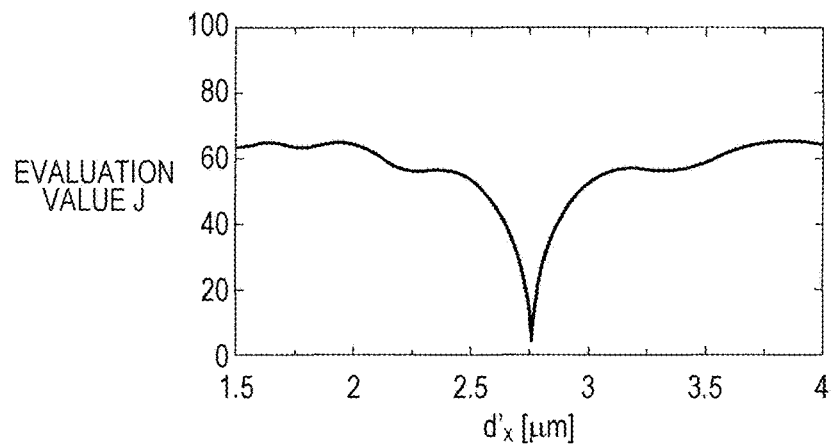
FIG. 7 is a drawing depicting evaluation values in the vicinity of a correct camera parameter for $d'_x$.
Figure 8:
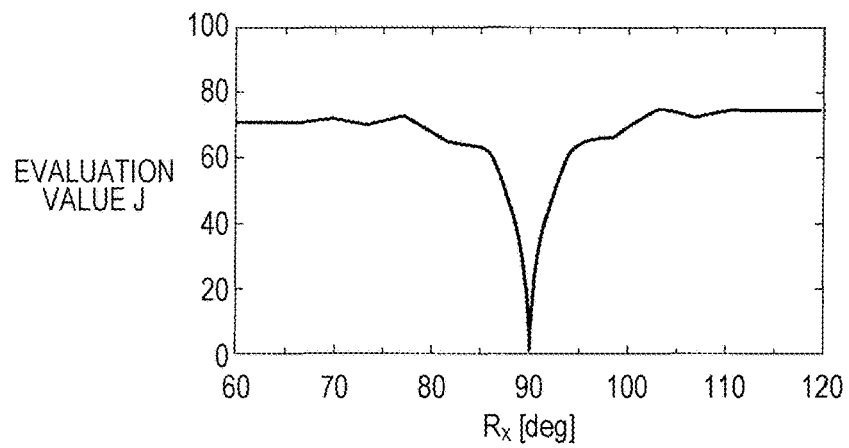
FIG. 8 is a drawing depicting evaluation values in the vicinity of a correct camera parameter for $R_x$.
Figure 9:
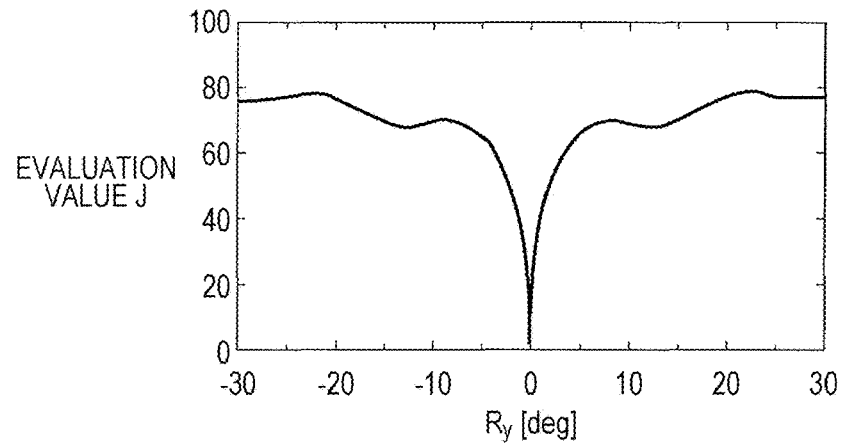
FIG. 9 is a drawing depicting evaluation values in the vicinity of a correct camera parameter for $R_y$.
Figure 10:
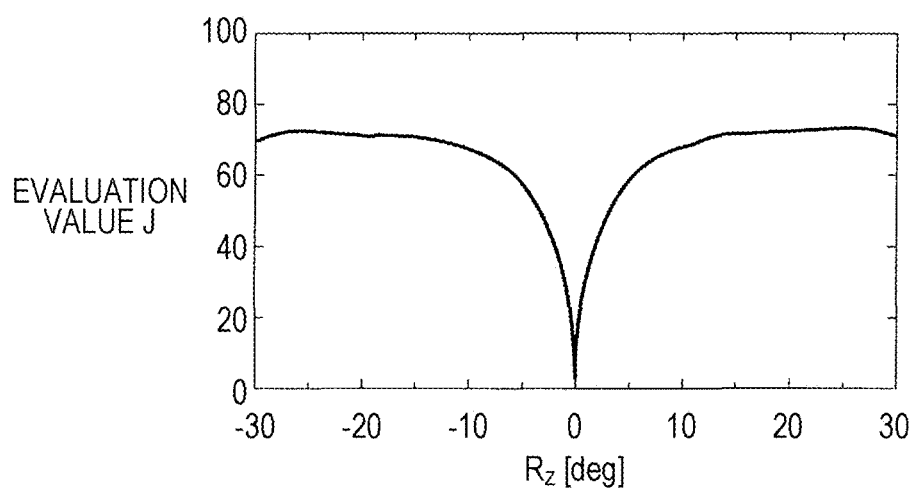
FIG. 10 is a drawing depicting evaluation values in the vicinity of a correct camera parameter for $R_z$.
Figure 11:
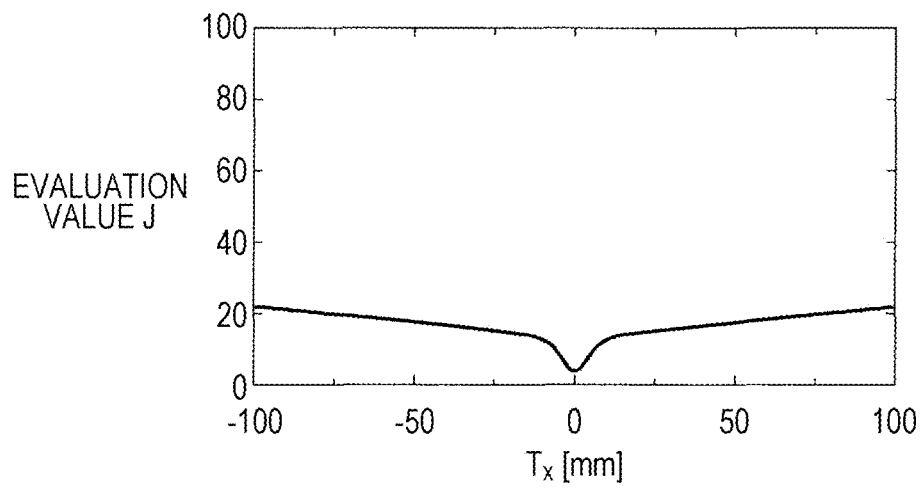
FIG. 11 is a drawing depicting evaluation values in the vicinity of a correct camera parameter for $T_x$.
Figure 12:
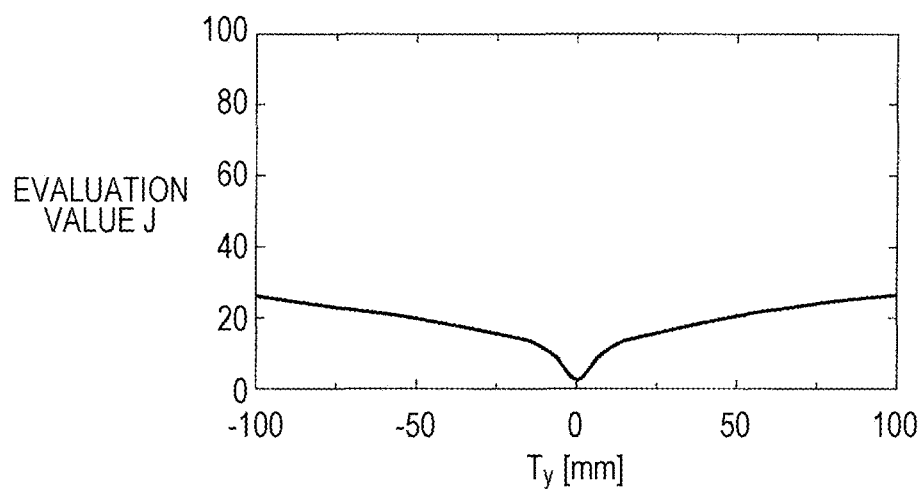
FIG. 12 is a drawing depicting evaluation values in the vicinity of a correct camera parameter for $T_y$.
Figure 13:
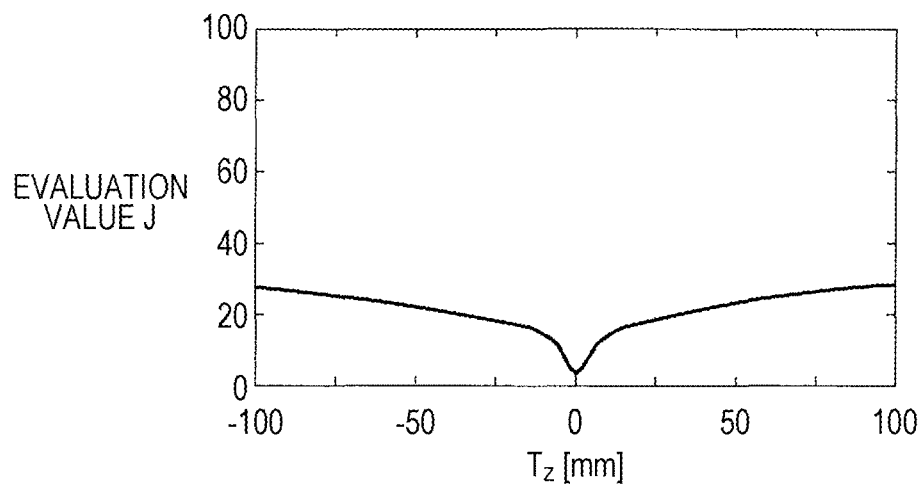
FIG. 13 is a drawing depicting evaluation values in the vicinity of a correct camera parameter for $T_z$.

CG mimicking a parking lot depicted in FIG. 3 is created. The right camera is separated 15 mm horizontally from the left camera, and the optical axis of the right camera is parallel with that of the left camera. Furthermore, it is assumed that the cameras are fish-eye cameras.

Evaluation values J obtained when only one camera parameter of the right camera is changed from a state in which the values of all of the camera parameters are correct are calculated with respect to the aforementioned CG model. These evaluation values J are depicted in FIGS. 4 to 13 for 10 camera parameters in which the horizontal axes indicate camera parameter values and the vertical axes indicate evaluation values J. The camera parameters that are changed are $C_x$ in FIG. 4, $C_y$ in FIG. 5, f in FIG. 6, $d'_x$ in FIG. 7, $R_x$ in FIG. 8, $R_y$ in FIG. 9, $R_z$ in FIG. 10, $T_x$ in FIG. 11, $T_y$ in FIG. 12, and $T_z$ in FIG. 13. Furthermore, the correct values for each camera parameter are as follows. More specifically, $C_x$ is 640 pixels, $C_y$ is 480 pixels, f is 1.12 mm, $d'_x$ is 2.75 μm, $R_x$ is 90°, $R_y$ is 0°, $R_z$ is 00, $T_x$ is 0 mm, $T_y$ is 0 mm, and $T_z$ is 0 mm.

In each of FIGS. 4 to 13, the evaluation values J are downwardly convex in the vicinity of the correct camera parameter, and the camera parameter with which the evaluation value J is minimized and the correct camera parameter match. Based on the above, camera calibration is possible with the present scheme.

It should be noted that in the case where there are three or more cameras, it is sufficient for the evaluation function J of expression 3 to be expanded to expression 5 with the number of cameras as n.

$$J = \frac{1}{N \cdot {}_nC_2}\sum_{i=1}^{n}\sum_{j=1}^{n}\sum_{k=1}^{N}|I_i(x_{ik}, y_{ik}) - I_j(x_{jk}, y_{jk})| \quad \text{(Expression 5)}$$

Here, the image coordinates of the $k^{th}$ corresponding point included in an $i^{th}$ camera image and a $j^{th}$ camera image are taken as $(x_{ik}, y_{ik})$ and $(x_{jk}, y_{jk})$. $I_i(x, y)$ represents a pixel value for an RGB value or a luminance value at the image coordinates (x, y) of an $i^{th}$ camera image, and $I_j(x, y)$ represents a pixel value for an RGB value or a luminance value at the image coordinates (x, y) of a $j^{th}$ camera image. The other variables are the same as the variables included in expression 3, and therefore a description thereof has been omitted.

As mentioned above, camera parameters are evaluated based on pixel values at pixel coordinates obtained by projecting three-dimensional coordinates onto an image using the camera parameters, and thus the camera parameters can be calculated, namely a camera can be calibrated, without using a calibration index having a known three-dimensional structure. A camera can therefore be calibrated without associating three-dimensional coordinates in a three-dimensional space and pixel locations in a two-dimensional image.

Embodiment 2

It is not necessary for the evaluation function in embodiment 1 to be restricted to the absolute value sum of the differences between pixel values indicated in expression 3. In embodiment 2, the case where the evaluation function is the square sum of the differences between pixel values will be described.

In embodiment 2, compared to embodiment 1, the only difference is the evaluation function used for calculating evaluation values. The functional configuration of the camera parameter calculation apparatus according to embodiment 2 is substantially the same as that of the camera parameter calculation apparatus 101 described in embodiment 1, and therefore a description thereof has been omitted.

Figure 14:
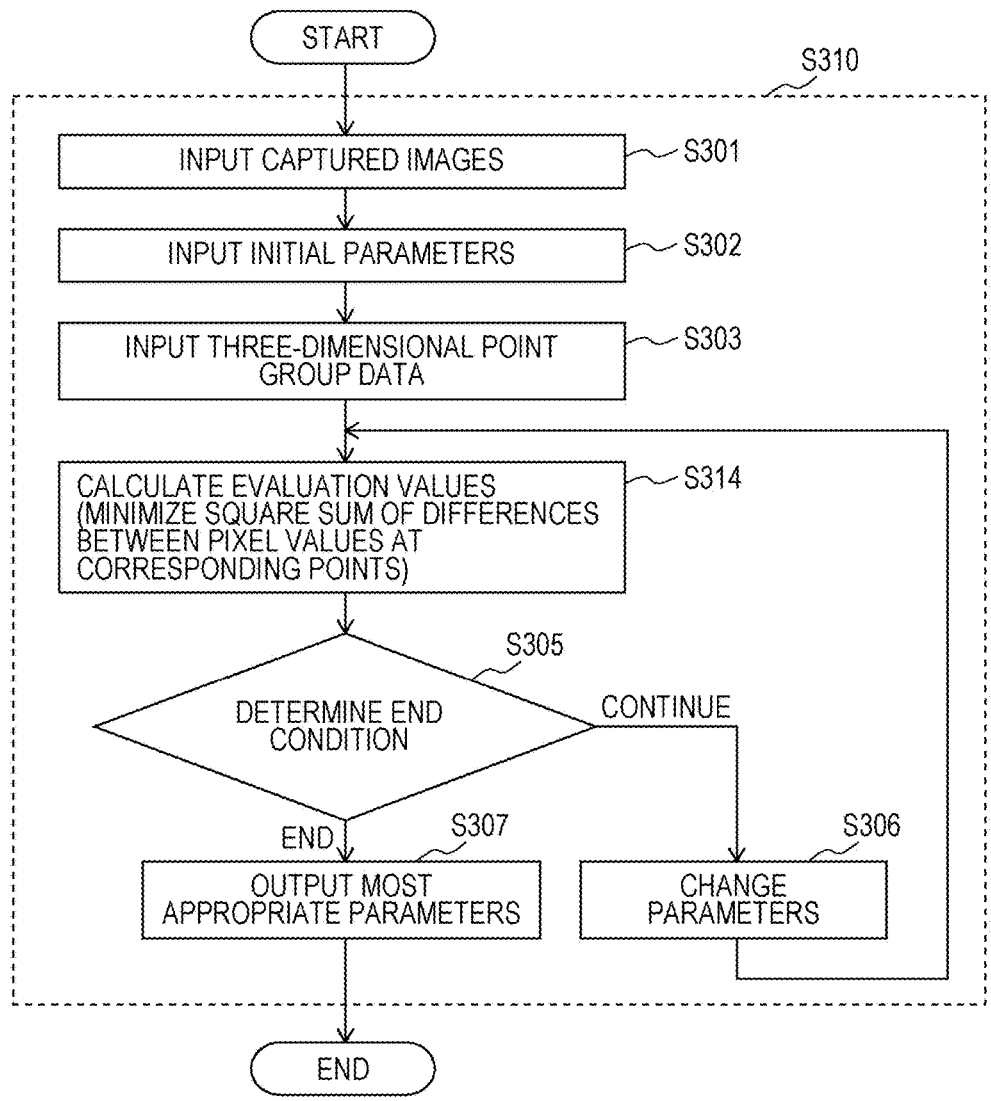
FIG. 14 is a flowchart depicting an example of an operation of a camera parameter calculation apparatus according to embodiment 2.

FIG. 14 is a flowchart depicting an example of camera parameter calculation processing S310 according to embodiment 2. In FIG. 14, the same steps as in embodiment 1 are denoted by the same step names as in FIG. 2, and therefore descriptions thereof have been omitted. Step S314 calculates an evaluation function J (expression 6) defined by the square sum of the differences between corresponding pixel values of a stereo camera.

$$J = \frac{1}{N} \sum_{k=1}^{N} (I_L(x_{Lk}, y_{Lk}) - I_R(x_{Rk}, y_{Rk}))^2 \quad \text{(Expression 6)}$$

Here, the variables of expression 6 are the same as the variables included in expression 3, and therefore a description thereof has been omitted.

It should be noted that in the case where there are three or more cameras, it is sufficient for the evaluation function J of expression 6 to be expanded to expression 7.

$$J = \frac{1}{N \cdot {}_nC_2} \sum_{i=1}^{n} \sum_{j=1}^{n} \sum_{k=1}^{N} (I_i(x_{ik}, y_{ik}) - I_j(x_{jk}, y_{jk}))^2 \quad \text{(Expression 7)}$$

Here, the variables of expression 7 are the same as the variables included in expression 5, and therefore a description thereof has been omitted.

As mentioned above, similar to embodiment 1, a camera can be calibrated without associating three-dimensional coordinates in a three-dimensional space and pixel locations in a two-dimensional image.

Embodiment 3

It is not necessary for the evaluation functions in embodiments 1 and 2 to be restricted to the absolute value sum or the square sum of the differences between pixel values indicated in expressions 3 and 6. In embodiment 3, the case where the evaluation function is the absolute value sum of the differences with an average pixel value will be described.

In embodiment 3, compared to embodiment 1, the only difference is the evaluation function for calculating evaluation values. The functional configuration of the camera parameter calculation apparatus according to embodiment 3 is substantially the same as that of the camera parameter calculation apparatus 101 described in embodiment 1, and therefore a description thereof has been omitted.

Figure 15:
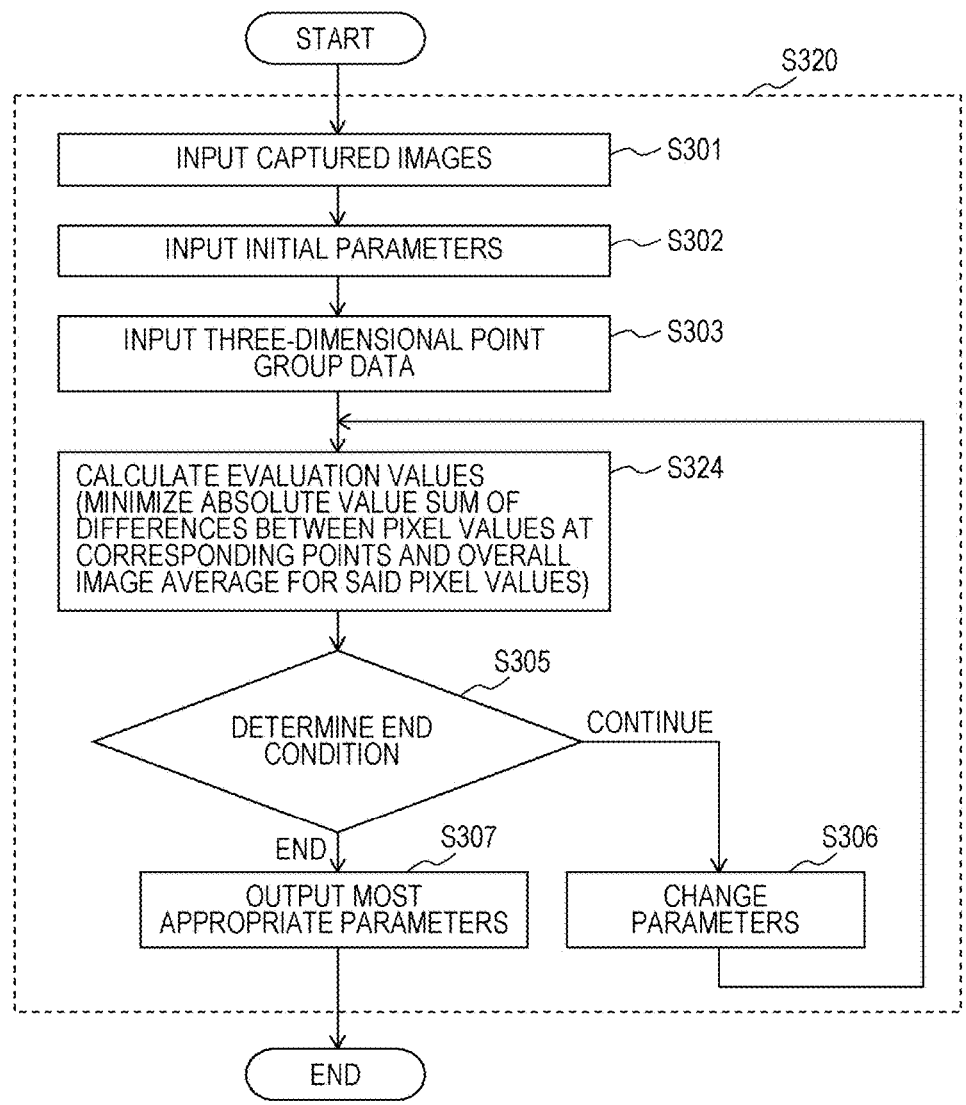
FIG. 15 is a flowchart depicting an example of camera parameter calculation processing according to embodiment 3.

FIG. 15 is a flowchart depicting an example of camera parameter calculation processing S320 according to embodiment 3. In FIG. 15, the same steps as in embodiment 1 are denoted by the same step names as in FIG. 2, and therefore descriptions thereof have been omitted. Step S324 calculates an evaluation function J (expression 8) defined by the absolute value sum of the differences between corresponding pixel values of a stereo camera and an average pixel value.

$$J = \frac{1}{2N} \sum_{k=1}^{N} (|I_L(x_{Lk}, y_{Lk}) - I'_k| + |I_R(x_{Rk}, y_{Rk}) - I'_k|) \quad \text{(Expression 8)}$$

Here, $I'_k$ represents the average in all camera images of the pixel value of the $k^{th}$ corresponding point. The other variables are the same as the variables included in expression 3, and therefore a description thereof has been omitted.

It should be noted that in the case where there are three or more cameras, it is sufficient for the evaluation function J of expression 8 to be expanded to expression 9.

$$J = \frac{1}{N \cdot n} \sum_{i=1}^{n} \sum_{k=1}^{N} |I_i(x_{ik}, y_{ik}) - I'_k| \quad \text{(Expression 9)}$$

Here, the variables of expression 9 are the same as the variables included in expressions 3 and 5, and therefore a description thereof has been omitted.

As mentioned above, similar to embodiment 1, a camera can be calibrated without associating three-dimensional coordinates in a three-dimensional space and pixel locations in a two-dimensional image.

Embodiment 4

It is not necessary for the evaluation functions in embodiments 1 to 3 to be restricted to the absolute value sum or the square sum of the differences between pixel values, or the absolute value sum of the differences with an average pixel value, indicated in expressions 3, 6, and 8. In embodiment 4, the case where the evaluation function is the square sum of the differences with an average pixel value will be described.

In embodiment 4, compared to embodiment 1, the only difference is the evaluation function for calculating evaluation values. The functional configuration of the camera parameter calculation apparatus according to embodiment 4 is substantially the same as that of the camera parameter calculation apparatus 101 described in embodiment 1, and therefore a description thereof has been omitted.

Figure 16:
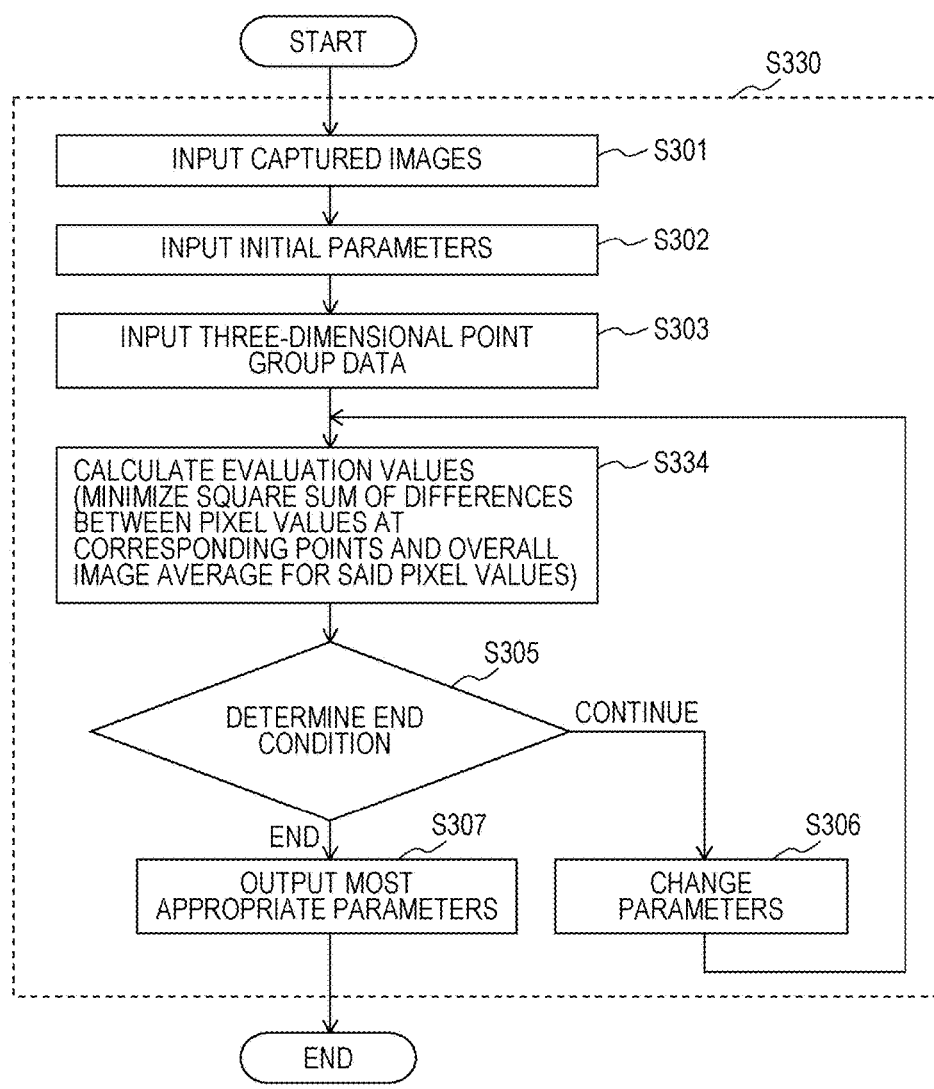
FIG. 16 is a flowchart depicting an example of camera parameter calculation processing according to embodiment 4.

FIG. 16 is a flowchart depicting an example of camera parameter calculation processing S330 according to embodiment 4. In FIG. 16, the same steps as in embodiment 1 are denoted by the same step names as in FIG. 2, and therefore descriptions thereof have been omitted. Step S334 calculates an evaluation function J (expression 10) defined by the square sum of the differences between corresponding pixel values of a stereo camera and an average pixel value.

$$J = \frac{1}{2N}\sum_{k=1}^{N}((I_L(x_{Lk}, y_{Lk}) - I'_k)^2 + (I_R(x_{Rk}, y_{Rk}) - I'_k)^2) \quad \text{(Expression 10)}$$

Here, the variables of expression 10 are the same as the variables included in expression 8, and therefore a description thereof has been omitted.

It should be noted that in the case where there are three or more cameras, it is sufficient for the evaluation function J of expression 10 to be expanded to expression 11.

$$J = \frac{1}{N \cdot n}\sum_{i=1}^{n}\sum_{k=1}^{N}(I_i(x_{ik}, y_{ik}) - I'_k)^2 \quad \text{(Expression 11)}$$

Here, the variables of expression 11 are the same as the variables included in expressions 3 and 8, and therefore a description thereof has been omitted.

As mentioned above, similar to embodiment 1, a camera can be calibrated without associating three-dimensional coordinates in a three-dimensional space and pixel locations in a two-dimensional image.

Embodiment 5

In embodiment 5, camera parameters are calculated on the basis of a degree of similarity between patterns in neighboring pixels of image coordinates of individual cameras corresponding to three-dimensional point group data, and the effect of a difference between pixel values $I_L(x, y)$ and $I_R(x, y)$ caused by a gain difference between cameras is thereby reduced.

Hereinafter, as a specific example, the case where the evaluation function is a normalized cross-correlation will be described.

In embodiment 5, compared to embodiment 1, the only difference is the evaluation function for calculating evaluation values. The functional configuration of the camera parameter calculation apparatus according to embodiment 5 is substantially the same as that of the camera parameter calculation apparatus 101 described in embodiment 1, and therefore a description thereof has been omitted.

Figure 17:
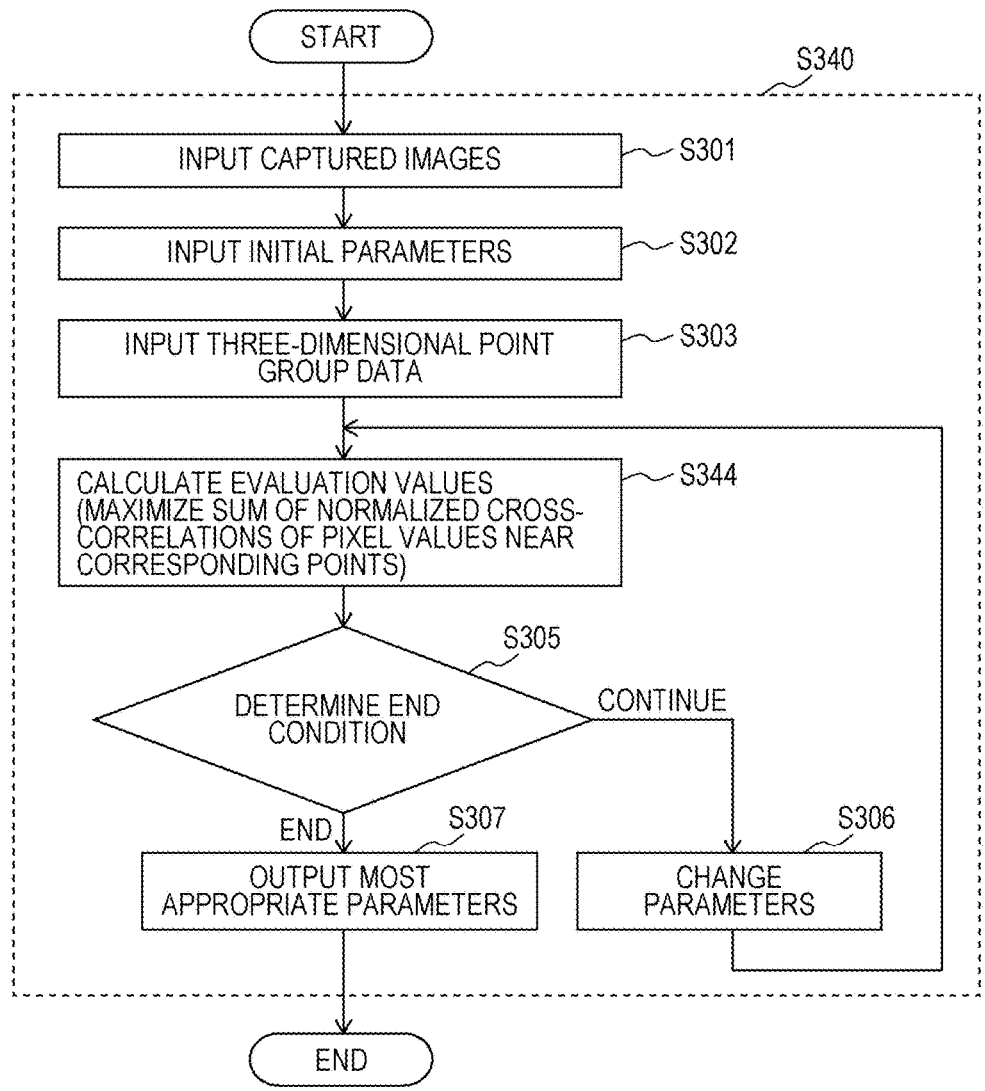
FIG. 17 is a flowchart depicting an example of camera parameter calculation processing according to embodiment 5.

FIG. 17 is a flowchart depicting an example of camera parameter calculation processing S340 according to embodiment 5. In FIG. 17, the same steps as in embodiment 1 are denoted by the same step names as in FIG. 2, and therefore descriptions thereof have been omitted. Step S344 calculates an evaluation function J (expression 12) defined by the normalized cross-correlation of corresponding pixel values of a stereo camera.

$$J = 1 - \frac{1}{N}\sum_{k=1}^{N}\left(\frac{\sum_{i=1}^{m} M_{Lki} M_{Rki}}{\sqrt{\sum_{i=1}^{m} M_{Lki}^2 \cdot \sum_{i=1}^{m} M_{Rki}^2}}\right) \quad \text{(Expression 12)}$$

Here, three-dimensional point groups to be compared are projected onto camera images captured by each of a left camera and a right camera according to camera parameters for the respective three-dimensional point groups, and image coordinates are obtained. m pixels are selected from the vicinity of these image coordinates. For example, pixels from within a circle centered about a projected pixel are selected. The $i^{th}$ pixel values of the selected m pixels of the left camera and the right camera are taken as $M_{Lki}$ and $M_{Rki}$. The other variables are the same as the variables included in expression 3, and therefore a description thereof has been omitted.

As mentioned above, by using normalized cross-correlations of pixel values, camera calibration can be carried out without being affected by gain differences between the left camera and the right camera.

It should be noted that in the case where there are three or more cameras, it is sufficient for the evaluation function J of expression 12 to be expanded to expression 13.

$$J = 1 - \frac{1}{N}\sum_{k=1}^{N}\left(\frac{\sum_{i=1}^{m}\prod_{j=1}^{n} M_{jki}}{\sqrt{\prod_{j=1}^{n}\sum_{i=1}^{m} M_{jki}^2}}\right) \quad \text{(Expression 13)}$$

Here, N represents the number of three-dimensional points for comparing pixel values, n represents the number of cameras, and $M_{jki}$ represents the $i^{th}$ pixel value in neighboring pixels with which a normalized cross-correlation is calculated for a pixel location in the $j^{th}$ camera image obtained by a camera corresponding to the $k^{th}$ three-dimensional point.

It should be noted that a ternary expression or a difference in pixel values between adjacent pixels may be used rather than a normalized cross-correlation.

Embodiment 6

In embodiment 1, an example was given in which three-dimensional point group data to be used for evaluation is selected based on pixel values; however, it is not necessary for the basis for selection to be restricted to pixel values. In embodiment 6, the case where three-dimensional point group data is selected based on a covered region will be described.

The functional configuration of the camera parameter calculation apparatus according to embodiment 6 is substantially the same as that of the camera parameter calculation apparatus 101 described in embodiment 1, and therefore a description thereof has been omitted.

Figure 18:
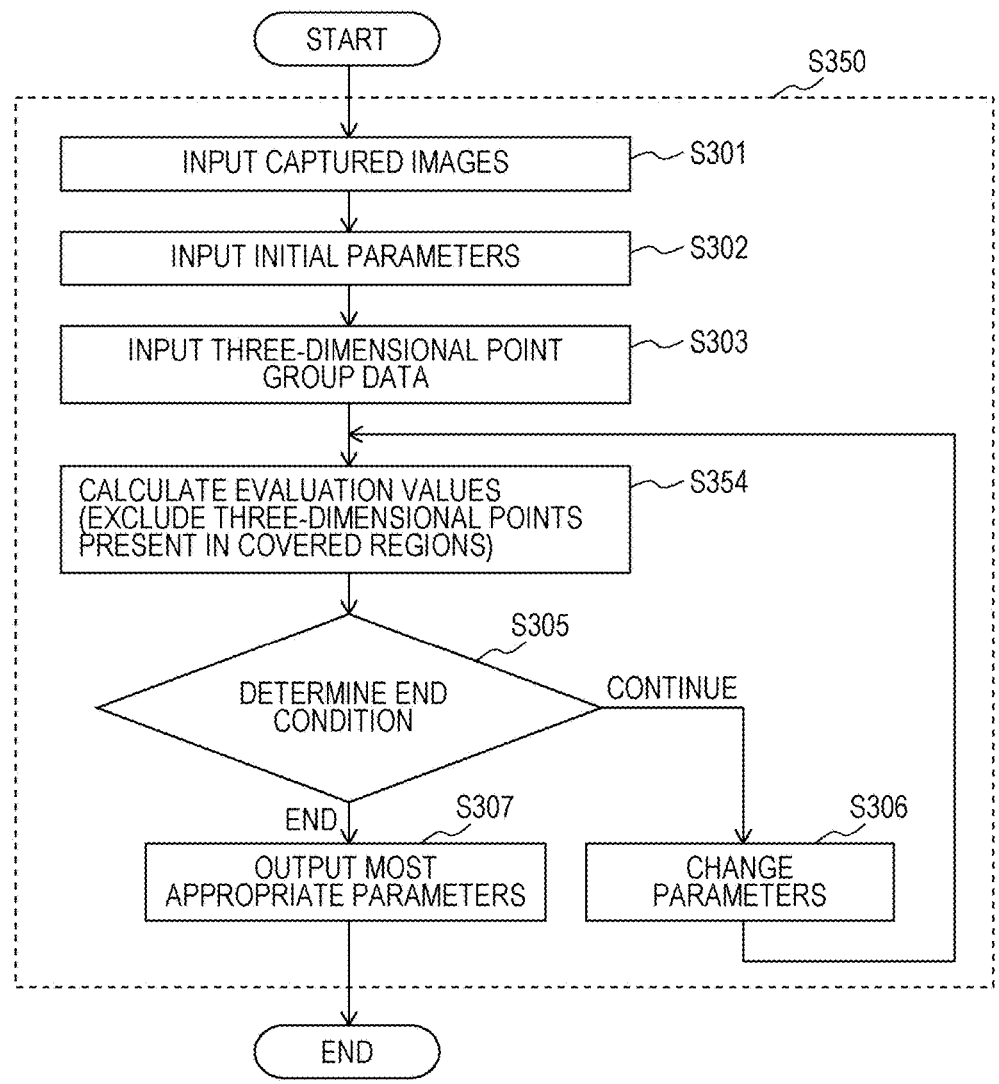
FIG. 18 is a flowchart depicting an example of camera parameter calculation processing according to embodiment 6.

FIG. 18 is a flowchart depicting an example of camera parameter calculation processing S350 according to embodiment 6. In FIG. 18, the same steps as in embodiment 1 are denoted by the same step names as in FIG. 2, and therefore descriptions thereof have been omitted. In step S354, data of three-dimensional points that are present in at least one covered region of the left camera 102 and the right camera 103 is excluded from the three-dimensional point group data obtained in step S303. A covered region is a region in which a front three-dimensional object within the covered region covers a rear three-dimensional object, and is a region that extends in one direction from a camera. The determining of this covered region will be described.

One point within a three-dimensional space corresponds to one optical path of light incident upon a camera. Even in the case where a plurality of three-dimensional objects are present side-by-side in a covered region, the three-dimensional laser scanner 106 obtains the world coordinates of the plurality of three-dimensional objects from viewpoints that are different from that of the camera. When the world coordinates are projected onto an image on the basis of the camera parameters, a plurality of image coordinates that are the same or have hardly any differences are calculated. That is, a plurality of corresponding points having a distance of separation that is equal to or less than a threshold value are obtained in one image, and it is thereby understood that a plurality of three-dimensional points are located in a covered region of the camera that captured said image. There is a possibility that the corresponding points of such three-dimensional points may represent pixel values that do not correspond to the original three-dimensional points and are therefore not appropriate for calculation of the evaluation values J.

Consequently, it is determined that sets of three-dimensional points for which the distance between image coordinates projected onto the image is less than a threshold value are three-dimensional points that are present in a covered region, and, according to said determination, evaluation values J are calculated excluding the three-dimensional points present in the covered region.

As mentioned above, by excluding three-dimensional points present in a covered region from the calculation of evaluation values, camera calibration can be carried out without being affected by covered regions.

Embodiment 7

In embodiments 1 and 6, examples were given in which three-dimensional point group data to be used for evaluation is selected based on pixel values or a covered region; however, it is not necessary for the basis for selection to be restricted thereto. In embodiment 7, a case will be described where three-dimensional point group data is selected based on the distance between two three-dimensional points with which an angle formed by measurement light of the three-dimensional laser scanner is less than a threshold value. The angle formed by measurement light of the three-dimensional laser scanner being less than a threshold value is synonymous with being visible within a predetermined vicinity from a distance measurement viewpoint and, for example, with a three-dimensional laser scanner that rotates about the two axes of a pan angle and a tilt angle, is defined as being close in terms of the pan angle and the tilt angle (that is, both the pan angle and the tilt angle are less than the threshold value).

The functional configuration of the camera parameter calculation apparatus according to embodiment 7 is substantially the same as that of the camera parameter calculation apparatus 101 described in embodiment 1, and therefore a description thereof has been omitted.

Figure 19:
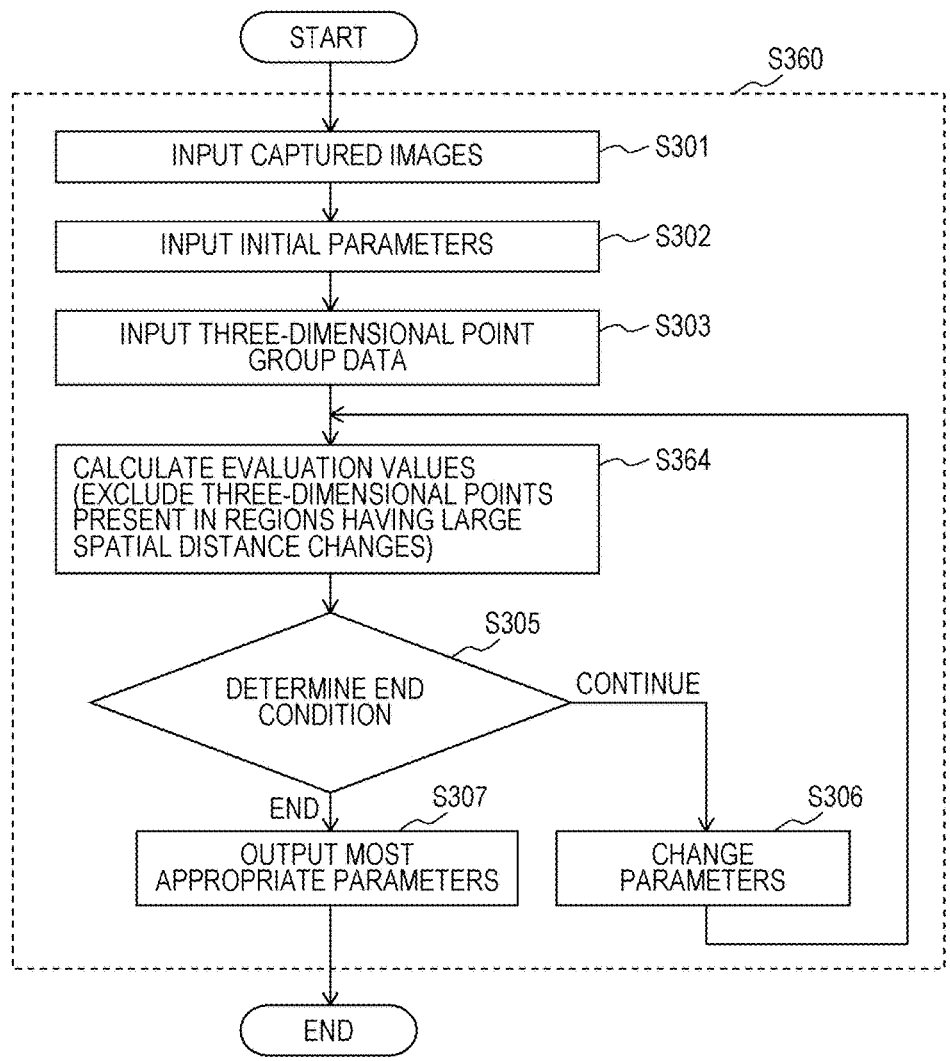
FIG. 19 is a flowchart depicting an example of camera parameter calculation processing according to embodiment 7.

FIG. 19 is a flowchart depicting an example of camera parameter calculation processing S360. In FIG. 19, the same steps as in embodiment 1 are denoted by the same step names as in FIG. 2, and therefore descriptions thereof have been omitted. In step S364, a region having a large change in spatial distance is excluded from the three-dimensional point group data obtained in step S303. The determining of this region having a large change in spatial distance will be described.

The three-dimensional laser scanner causes a laser radiation port to rotate about a plurality of rotation axes, and obtains three-dimensional point group data at certain angle intervals. To simplify the description, it is assumed that the center of rotation of the three-dimensional laser scanner is the point of origin, and that the laser radiation port rotates about the two rotation axes of a pan angle and a tilt angle centered about said point of origin. A distance between two three-dimensional points with which the pan angle and the tilt angle are close is approximated by a difference between depth values measured by the three-dimensional laser scanner, for example. A region including sets of points in which the largest value for the distance between two three-dimensional points with which the pan angle and the tilt angle are close is greater than a threshold value is determined as a region having a large change in spatial distance. According to said determination, evaluation values J are calculated excluding three-dimensional point groups that are present in regions having a large change in spatial distance. According to said exclusion, the general form of the function for the evaluation values J becomes smooth, and minimization of the evaluation values J is facilitated.

As mentioned above, by excluding three-dimensional point group data of regions having a large spatial change, camera calibration can be carried out without being affected by three-dimensional point group data that is present in boundaries between objects or surfaces having considerable unevenness.

Embodiment 8

In embodiments 1, 6, and 7, examples were given in which three-dimensional point group data to be used for evaluation is selected based on pixel values, covered regions, or spatial changes in the distance between two points of a three-dimensional point group with which the pan angle and the tilt angle of the three-dimensional laser scanner are close; however, it is not necessary for there to be any restriction thereto. In embodiment 8, the case where three-dimensional point group data is selected based on intensity values will be described. The functional configuration of the camera parameter calculation apparatus according to embodiment 8 is substantially the same as that of the camera parameter calculation apparatus 101 described in embodiment 1, and therefore a description thereof has been omitted.

Figure 20:
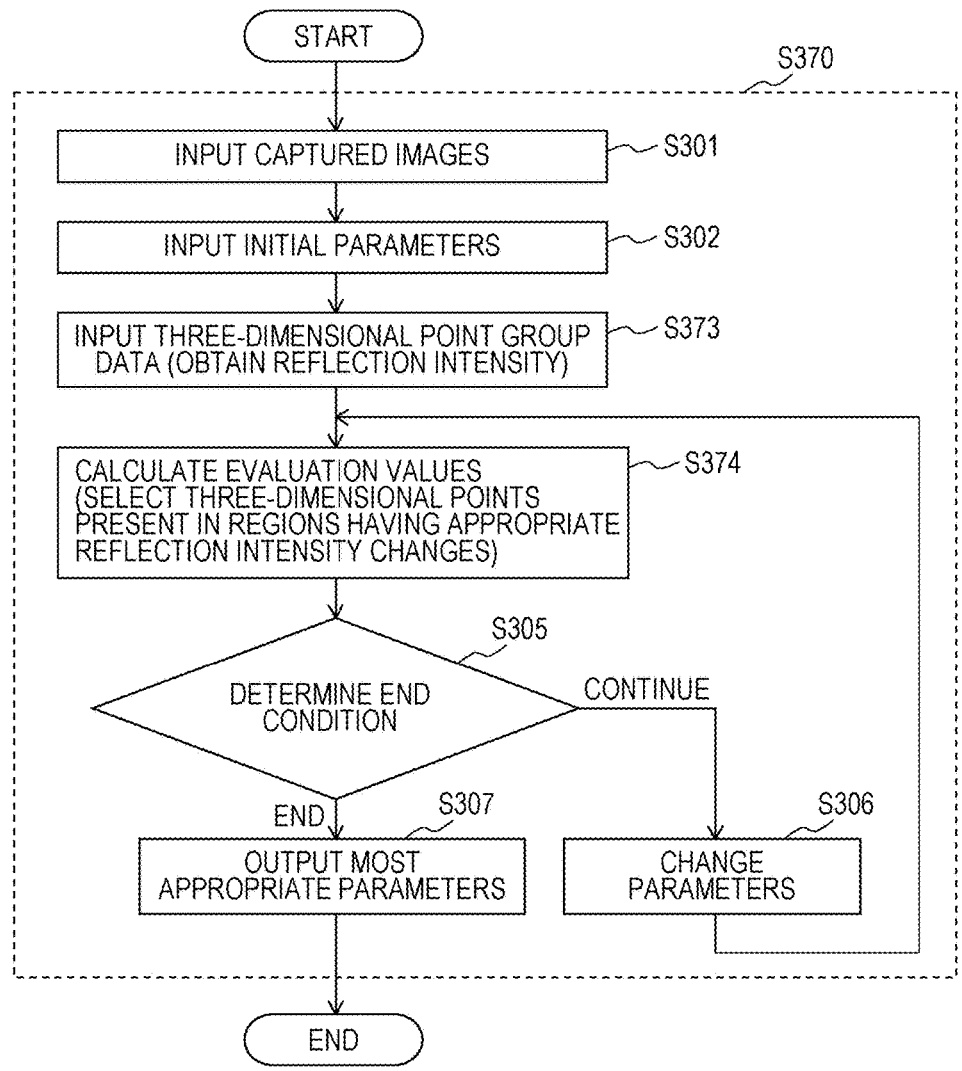
FIG. 20 is a flowchart depicting an example of camera parameter calculation processing according to embodiment 8.

FIG. 20 is a flowchart depicting an example of camera parameter calculation processing S370. In FIG. 20, the same steps as in embodiment 1 are denoted by the same step names as in FIG. 2, and therefore descriptions thereof have been omitted. In step S374, three-dimensional point group data is selected based on intensity values, from three-dimensional point group data including intensity values obtained in step S373. The selection method will be described.

The three-dimensional laser scanner radiates a laser onto an object, and the depth of the object is calculated based on reflected light received therefrom. Therefore, intensity values (received light intensity or object reflectance) that are associated with three-dimensional point group data can be obtained. The intensity values change according to the shape and material of an object surface, and there is a correlation with the color of the object surface. Said correlation will be described hereinafter. White and black objects that do not emit light themselves in the visible light region respectively correspond to the case where light reflectance is high and the case where light reflectance is low. Therefore, the reflection characteristics of an object with respect to visible or near-infrared laser light are close to the reflection characteristics of visible light. Consequently, there is a correlation between the color of an object surface and the intensity values.

In a three-dimensional laser scanner that rotates about the two axes of a pan angle and a tilt angle similar to that described in embodiment 7, sets of three-dimensional points in which the difference between the intensity values of any two points of a three-dimensional point group that are close in terms of the pan angle and the tilt angle (that is, visible within a predetermined vicinity from the distance measurement viewpoint) is less than a first threshold value or is greater than a second threshold value are excluded from the three-dimensional point group data obtained in S303. According to said exclusion, three-dimensional point groups in which the difference between intensity values is small and the evaluation values J do not change, and three-dimensional point groups in which the difference between intensity values is large and the change in the evaluation values J is large are excluded from the calculation of the evaluation values, and therefore the approximate form of the function for the evaluation values J becomes smooth, and minimization of the evaluation values J is facilitated.

As mentioned above, by excluding three-dimensional point group data in which the difference between intensity values is large, camera calibration can be carried out without being affected by three-dimensional point group data that is present on an object surface having a large change in color.

Embodiment 9

In embodiments 1 and 6 to 8, examples were given in which three-dimensional point group data to be used for evaluation is selected based on pixel values, covered regions, spatial changes in the distance between two points of a three-dimensional point group with which the pan angle and the tilt angle of the three-dimensional laser scanner are close, or intensity values; however, it is not necessary for there to be any restriction thereto. In embodiment 9, the case where three-dimensional point group data is selected based on color information of a three-dimensional point group will be described.

The functional configuration of the camera parameter calculation apparatus according to embodiment 9 is substantially the same as that of the camera parameter calculation apparatus 101 described in embodiment 1, and therefore a description thereof has been omitted.

Figure 21:
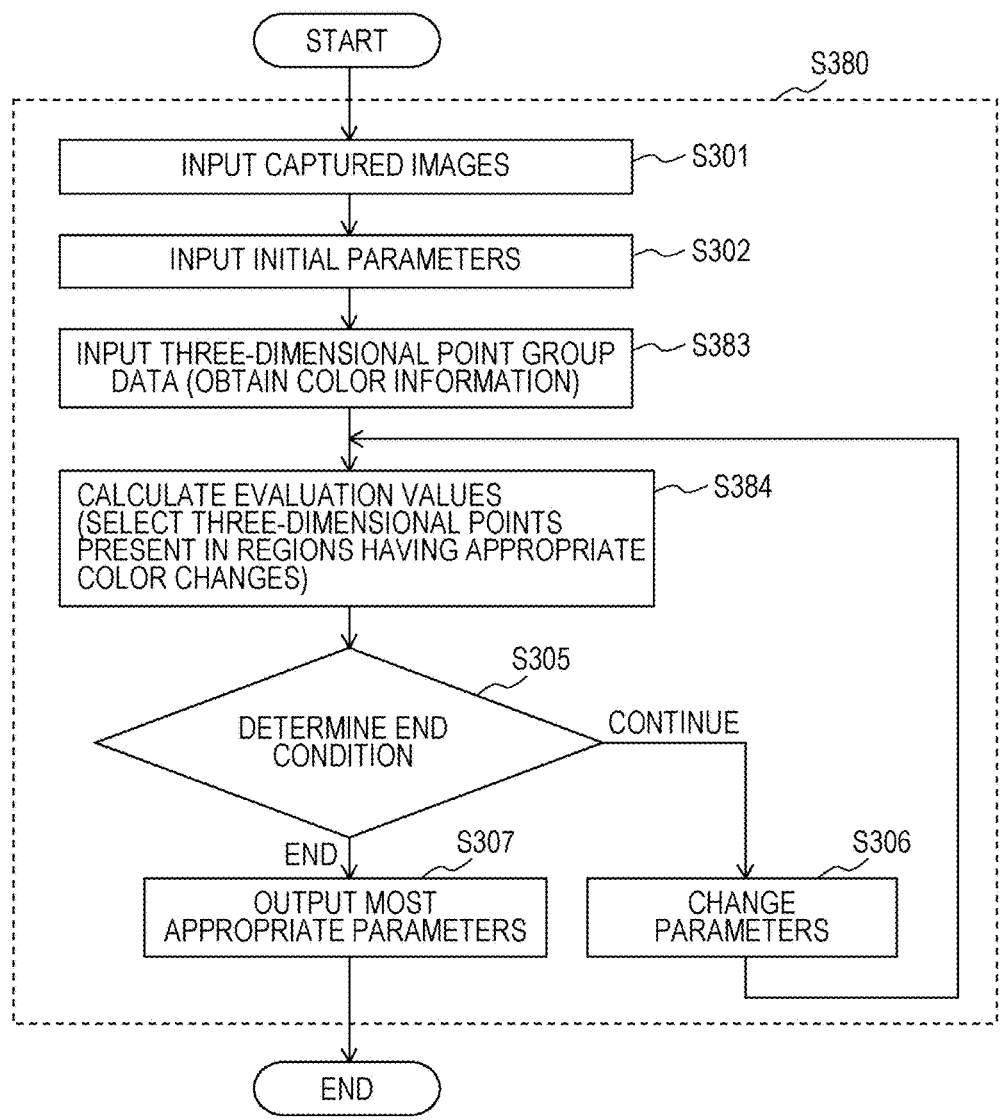
FIG. 21 is a flowchart depicting an example of camera parameter calculation processing according to embodiment 9.

FIG. 21 is a flowchart depicting an example of camera parameter calculation processing S380. In FIG. 21, the same steps as in embodiment 1 are denoted by the same step names as in FIG. 2, and therefore descriptions thereof have been omitted. In step S384, three-dimensional point group data is selected based on color information of a three-dimensional point group, from three-dimensional point group data including color information obtained in step S383. The selection method will be described.

Color information (for example, RGB values or luminance values) associated with three-dimensional point group data can be obtained in the case where visible light imaging is possible at the same axis as the laser radiation axis of the three-dimensional laser scanner. In a three-dimensional laser scanner that rotates about the two axes of a pan angle and a tilt angle similar to that described in embodiment 7, sets of three-dimensional points in which the difference between color information (for example, RGB values or luminance values) of any two points of a three-dimensional point group that are close in terms of the pan angle and the tilt angle (that is, visible within a predetermined vicinity from the distance measurement viewpoint) is less than a first threshold value or is greater than a second threshold value are excluded from the three-dimensional point group data obtained in S383. According to said exclusion, three-dimensional point groups in which the difference between color information values is small and the evaluation values J do not change, and three-dimensional point groups in which the difference between color information is large and the change in the evaluation values J is large are excluded from the calculation of the evaluation values, and therefore the approximate form of the function for the evaluation values J becomes smooth, and minimization of the evaluation values J is facilitated.

As mentioned above, by excluding three-dimensional point group data in which the difference in color information is large, camera calibration can be carried out without being affected by three-dimensional point group data that is present on an object surface having a large change in color.

Embodiment 10

In embodiments 1 and 6 to 9, camera calibration using a multi-lens camera and a three-dimensional laser scanner was described; however, in the case where the three-dimensional laser scanner is able to obtain color information as described in embodiment 9, a camera can be calibrated with one camera and the three-dimensional laser scanner. In embodiment 10, camera calibration by means of one camera and a three-dimensional laser scanner will be described.

Figure 22:
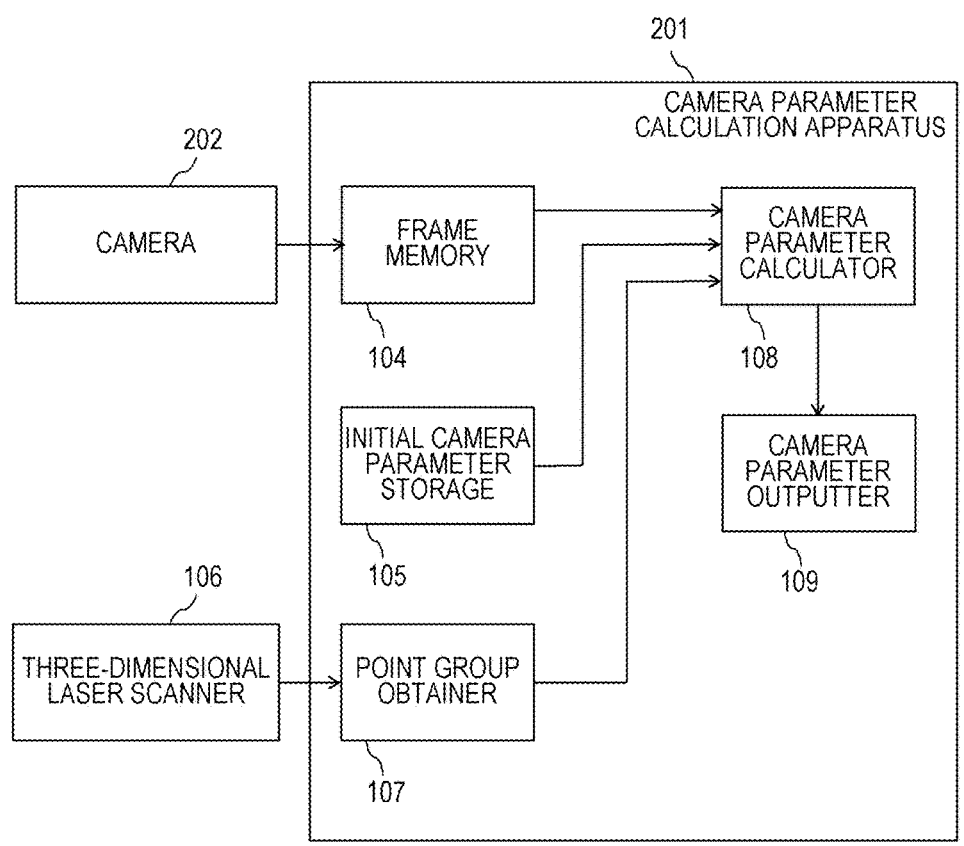
FIG. 22 is a block diagram of a camera parameter calculation apparatus according to embodiment 10.

FIG. 22 is a block diagram of a camera parameter calculation apparatus 201. In FIG. 22, the same constituent elements as in embodiment 1 are denoted by the same reference numbers as in FIG. 1, and therefore descriptions thereof have been omitted. Compared to the camera parameter calculation apparatus 101 of embodiment 1, the camera parameter calculation apparatus 201 is different in that there is only one camera 202 to be corrected, and in that the evaluation function used for the camera parameter calculation processing in the camera parameter calculator 108 is different.

Figure 23:
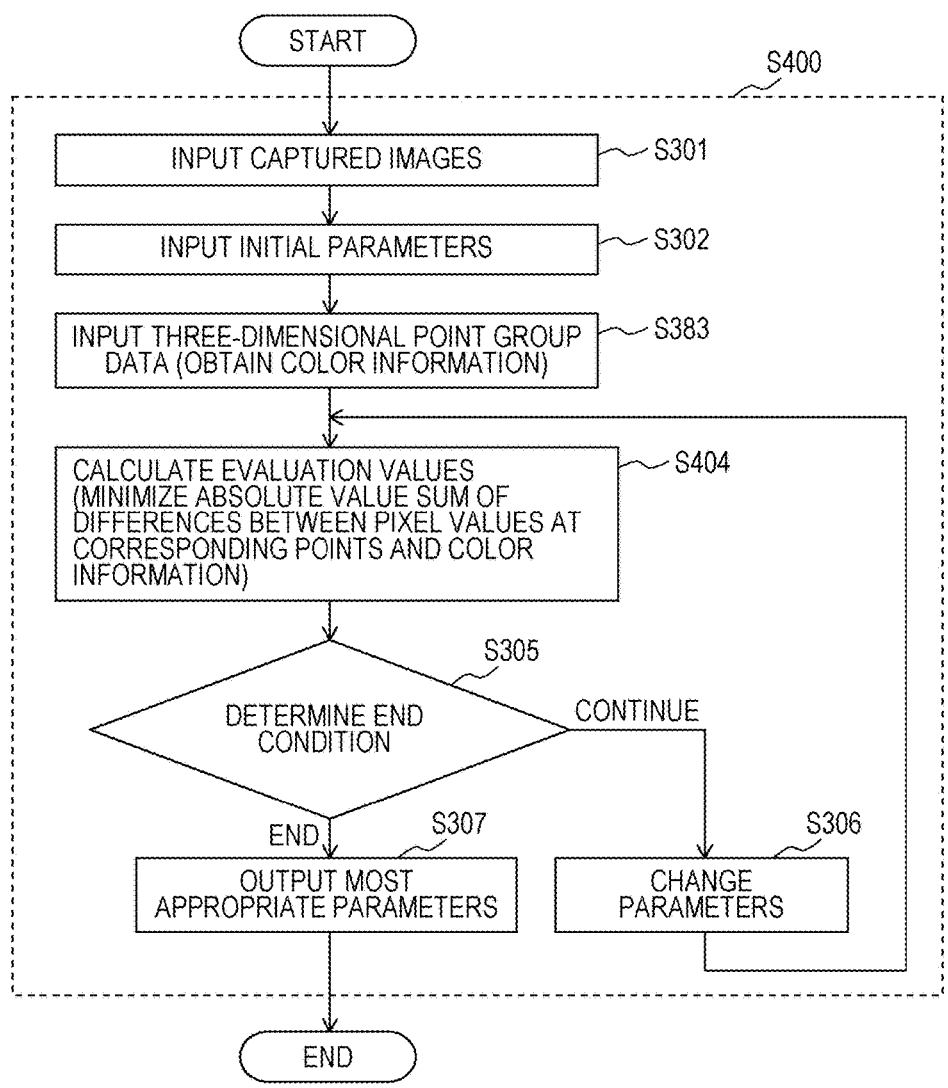
FIG. 23 is a flowchart depicting an example of camera parameter calculation processing according to embodiment 10.

FIG. 23 is a flowchart depicting a parameter calculation operation of camera parameter calculation processing S400 according to embodiment 10. In FIG. 23, the same steps as in embodiments 1 and 9 are denoted by the same step names as in FIGS. 3 and 21, and therefore descriptions thereof have been omitted. Color information obtained by imaging at the same axis as that of the three-dimensional laser scanner is added to the three-dimensional point group data obtained in step S383. Expression 14 indicates the evaluation function J used in the evaluation value calculation of step S404.

$$J = \frac{1}{N}\sum_{k=1}^{N}|I(x_k, y_k) - A_k| \qquad \text{(Expression 14)}$$

Here, $A_k$ represents the color information of a three-dimensional point used for calculating the $k^{th}$ image coordinates of a camera. The color information is made to be the same color information as the pixel values of the camera.

For example, in the case where the pixel values of the camera are RGB values, the color information of $A_k$ uses RGB values. The other variables are the same as the variables included in expression 3, and therefore a description thereof has been omitted.

As mentioned above, in the camera parameter calculation processing S400 of embodiment 10, camera calibration can be carried out by means of one camera and a three-dimensional laser scanner by using the color information of three-dimensional points.

It should be noted that the absolute value sum of differences between pixel values and color information of expression 14 may be a square sum of the differences. Furthermore, two or more cameras may be used.

Embodiment 11

In embodiment 11, camera parameters are calculated excluding regions in which an image luminance gradient is not present or is sufficiently small, and thus the calculation amount is reduced with calculations for regions having little contribution to evaluation values being omitted.

The aforementioned is based on the following approach. More specifically, in the case where the luminance gradient is 0 around pixels of two camera images to which a certain three-dimensional point corresponds, the luminance difference between the two pixels with respect to this three-dimensional point is mostly fixed even if the camera parameters are changed slightly. In other words, there is no effect on the calculation of camera parameters for minimizing the evaluation values J. Hence, the calculation amount can be reduced by excluding such three-dimensional points from the calculation of the evaluation values J.

In embodiment 11, compared to embodiment 1, the only difference is the operation of the camera parameter calculator 108 for calculating the camera parameters. The functional configuration of the camera parameter calculation apparatus 101 according to embodiment 11 is substantially the same as that of the camera parameter calculation apparatus 101 described in embodiment 1, and therefore a description thereof has been omitted.

Figure 24:
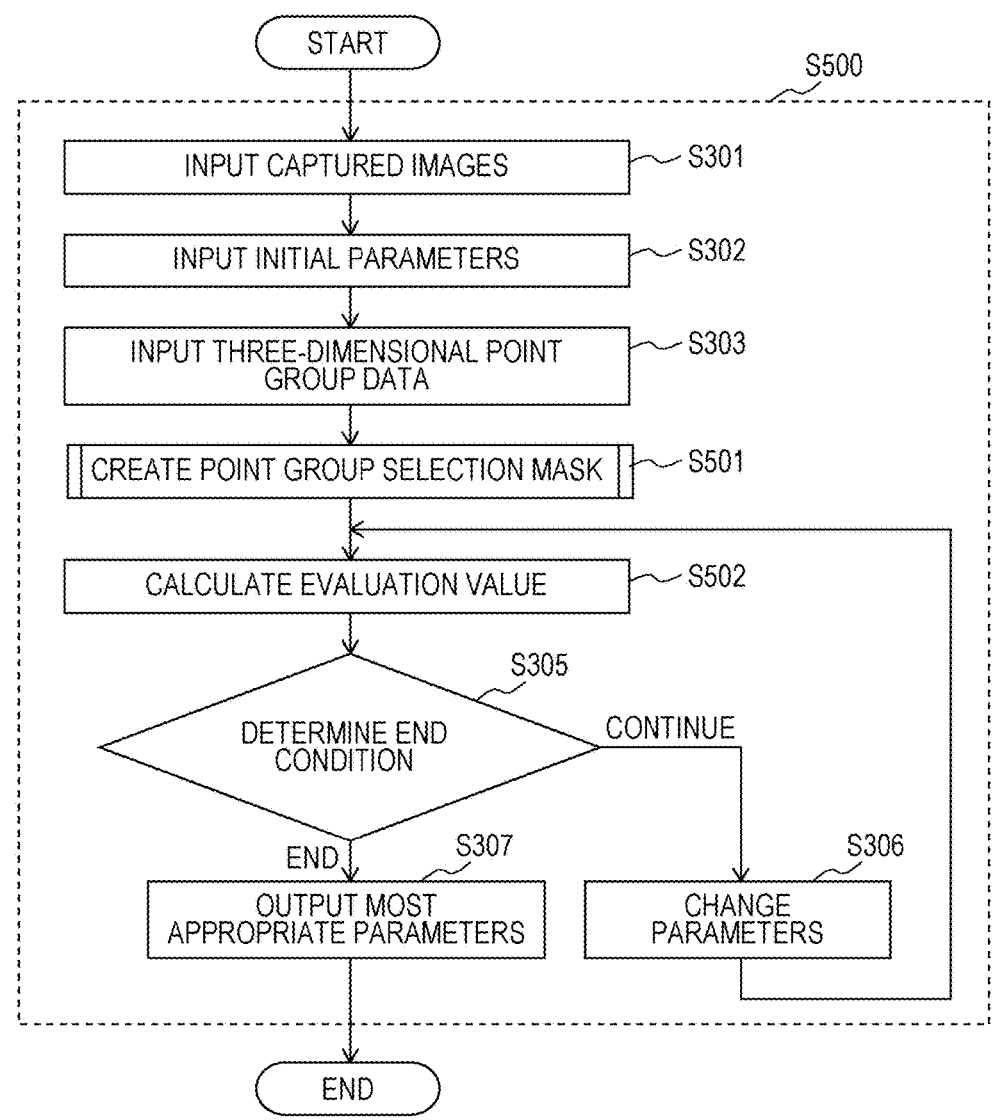
FIG. 24 is a flowchart depicting an example of camera parameter calculation processing according to embodiment 11.

FIG. 24 is a flowchart depicting an example of camera parameter calculation processing S500 according to embodiment 11. In FIG. 24, the same steps as in embodiment 1 are denoted by the same step names as in FIG. 2, and therefore descriptions thereof have been omitted.

In step S501 of FIG. 24, the camera parameter calculator 108 creates a point group selection mask for determining whether or not each of the three-dimensional points of N points acquired in step S303 is to be used for the calculation of evaluation values, on the basis of a luminance gradient of a camera image obtained in step S301. With respect to each pixel in the camera image, the point group selection mask takes two values indicating whether the pixel in question is a valid pixel that is to be used for calculating evaluation values or an invalid pixel where the luminance value of said pixel is not to be used for calculating evaluation values. The point group selection mask is created for individual camera images captured by one or more cameras.

Figure 25:
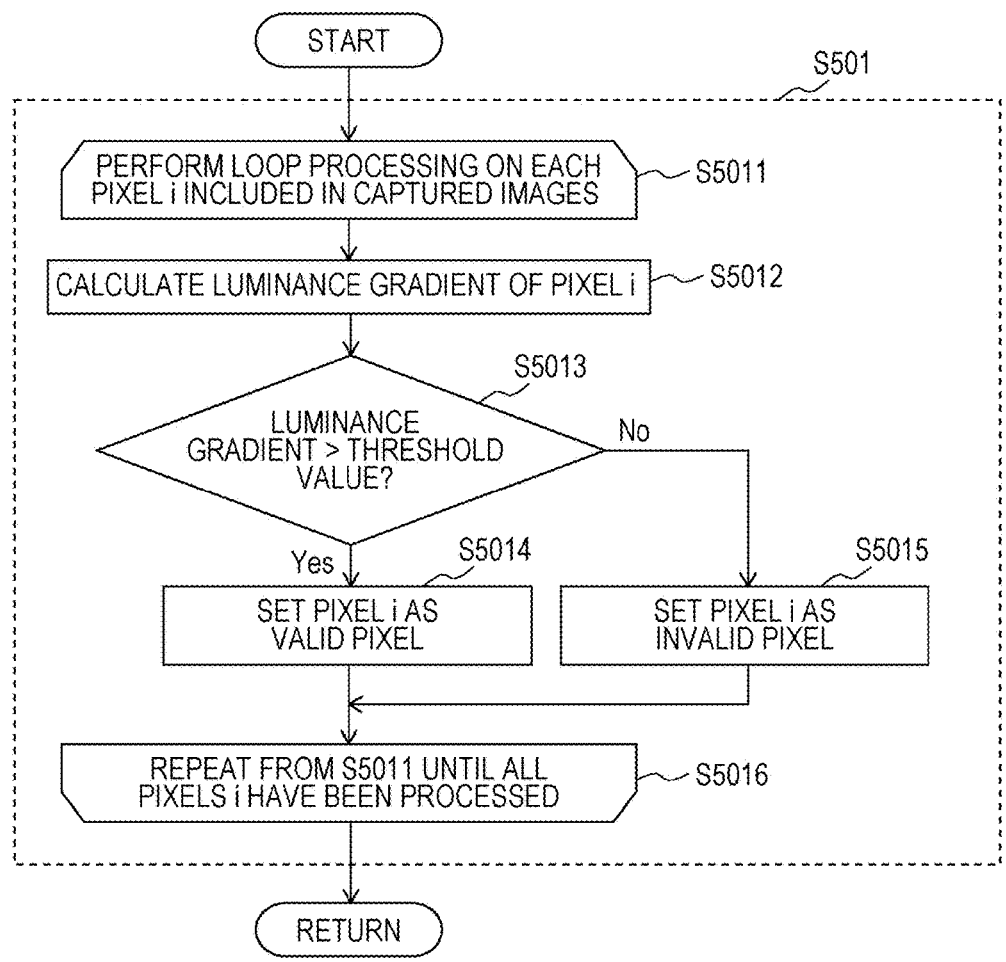
FIG. 25 is a flowchart depicting an example of point group selection mask creation processing according to embodiment 11.

FIG. 25 is a flowchart depicting a detailed example of point group selection mask creation processing S501.

In the point group selection mask creation processing S501, a pixel index is taken as i, and loop processing is carried out in which the pixels i in the camera image are sequentially selected and it is specified whether the selected pixel i is a valid pixel or an invalid pixel (S5011 to S5016).

A luminance gradient $G_i$ of the pixel i is calculated from neighboring pixels centered about the pixel i (S5012). As an example of the luminance gradient, the luminance gradient $G_i$ according to neighboring pixels centered about the pixel i is indicated in expression 15.

$$G_i = \sqrt{f_x(x_i,y_i)^2 + f_y(x_i,y_i)^2}$$

$$f_x(x_i,y_i) = I(x_i+1,y_i) - I(x_i-1,y_i)$$

$$f_y(x_i,y_i) = I(x_i,y_i+1) - I(x_i,y_i-1) \qquad \text{(Expression 15)}$$

Here, I(x, y) is a luminance value at image coordinates (x, y).

A threshold value is compared with the luminance gradient $G_i$ (S5013), and in the case where the luminance gradient $G_i$ is greater than the threshold value, the pixel i is set as a valid pixel in the point group selection mask (S5014). Furthermore, in the case where the luminance gradient $G_i$ is equal to or less than the threshold value, the pixel i is set as an invalid pixel in the point group selection mask (S5015). The threshold value, as an example, may be a constant multiple of the average luminance gradient of the entire image.

Once again referring to FIG. 24, in step S502, the camera parameter calculator 108 calculates the evaluation function J (for example, expression 3) using only the three-dimensional coordinates selected based on the point group selection mask created in step S501, from within the three-dimensional point group data obtained in step S303.

In the example of a stereo camera, in the case where a pixel located at a corresponding point of a certain three-dimensional point is indicated as an invalid pixel by the point group selection mask in at least one of the left/right camera images, the pixel value on the camera image corresponding to said three-dimensional point may be excluded from the calculation of the evaluation function.

Furthermore, in the case where a pixel located at a corresponding point of a certain three-dimensional point is indicated as an invalid pixel by the point group selection mask in both of the left/right camera images, the pixel value on the camera image corresponding to said three-dimensional point may be excluded from the calculation of the evaluation function. As mentioned above, from within the three-dimensional point group data, only three-dimensional points having a small luminance gradient at corresponding points of a camera image are excluded from the calculation of the evaluation function J, and thus camera calibration can be carried out with the calculation amount being reduced.

It should be noted it is not necessary for the evaluation function J to be restricted to expression 3, and expressions 4 to 14 may be used. Furthermore, the point group selection mask does not have to indicate valid pixels or invalid pixels with respect to all of the pixels of each camera image, and may indicate valid pixels or invalid pixels with respect to only neighboring pixels of a corresponding point of each three-dimensional point.

Modified Examples

Heretofore, the camera parameter calculation apparatus according to one or more aspects of the present disclosure has been described based on embodiments; however, the present disclosure is not restricted to these embodiments. Modes in which various modifications conceived by a person skilled in the art have been implemented in the present embodiments, and modes constructed by combining the constituent elements in different embodiments may also be included within the scope of the one or more aspects of the present disclosure provided they do not depart from the purpose of the present disclosure.

The camera parameter calculation apparatus of the present disclosure is useful as a camera parameter calculation apparatus for calibrating various types of cameras without using a calibration index having a known three-dimensional structure.

What is claimed is:

1. A camera parameter calculation apparatus, comprising:
a point group obtainer that obtains three-dimensional point group data indicating three-dimensional coordinates of a plurality of three-dimensional points included in a common imaging space of one or more cameras;
a camera parameter calculator that (i) calculates image coordinates of corresponding points, for each of the plurality of three-dimensional points, in one or more images captured using the one or more cameras, based on the three-dimensional point group data and one or more initial camera parameters of the one or more cameras, and (ii) calculates one or more camera parameters of the one or more cameras, based on pixel values, included in the one or more images, at the image coordinates; and
a camera parameter outputter that outputs the one or more camera parameters,
wherein the one or more cameras and the one or more initial camera parameters are in one-to-one relationship, the one or more cameras and the one or more images are in one-to-one relationship, and the one or more cameras and the one or more camera parameters are in one-to-one relationship,
wherein calculation of the image coordinates includes the camera parameter calculator converting the plurality of three-dimensional coordinates into the image coordinates in the one or more images corresponding to the one or more cameras, based on the one or more initial camera parameters corresponding to the one or more cameras,
wherein the one or more cameras include two cameras,
the camera parameter calculator calculates the one or more camera parameters on the basis of a plurality of difference values, and
each of the plurality of difference values is an absolute value of a difference between:
a pixel value at a corresponding point, for one three-dimensional point from among the plurality of three-dimensional points, in a first image captured by a first camera included in the two cameras; and
a pixel value at a corresponding point, for the one three-dimensional point, in a second image captured by a second camera included in the two cameras.

2. A camera parameter calculation apparatus, comprising:
a point group obtainer that obtains three-dimensional point group data indicating three-dimensional coordinates of a plurality of three-dimensional points included in a common imaging space of one or more cameras;
a camera parameter calculator that (i) calculates image coordinates of corresponding points, for each of the plurality of three-dimensional points, in one or more images captured using the one or more cameras, based on the three-dimensional point group data and one or more initial camera parameters of the one or more cameras, and (ii) calculates one or more camera parameters of the one or more cameras, based on pixel values, included in the one or more images, at the image coordinates; and
a camera parameter outputter that outputs the one or more camera parameters,
wherein the one or more cameras and the one or more initial camera parameters are in one-to-one relationship, the one or more cameras and the one or more images are in one-to-one relationship, and the one or more cameras and the one or more camera parameters are in one-to-one relationship,
wherein calculation of the image coordinates includes the camera parameter calculator converting the plurality of three-dimensional coordinates into the image coordinates in the one or more images corresponding to the one or more cameras, based on the one or more initial camera parameters corresponding to the one or more cameras,
wherein the one or more cameras include two cameras,
the camera parameter calculator calculates the one or more camera parameters on the basis of a plurality of difference values, and each of the plurality of difference values is a square value of a difference between:
a pixel value at a corresponding point, for one three-dimensional point from among the plurality of three-dimensional points, in a first image captured by a first camera included in the two cameras; and
a pixel value at a corresponding point, for the one three-dimensional point, in a second image captured by a second camera included in the two cameras.

3. A camera parameter calculation method, including:
obtaining three-dimensional point group data indicating three-dimensional coordinates of a plurality of three-dimensional points included in a common imaging space of one or more cameras;
calculating image coordinates of corresponding points, for each of the plurality of three-dimensional points, in one or more images captured using the one or more cameras, based on the three-dimensional point group data and one or more initial camera parameters of the one or more cameras;
calculating one or more camera parameters of the one or more cameras, based on pixel values, included in the one or more images, at the image coordinates; and
outputting the one or more camera parameters,
wherein the one or more cameras and the one or more initial camera parameters are in one-to-one relationship, the one or more cameras and the one or more images are in one-to-one relationship, and the one or more cameras and the one or more camera parameters are in one-to-one relationship,
wherein calculation of the image coordinates includes the camera parameter calculator converting the plurality of three-dimensional coordinates into the image coordinates in the one or more images corresponding to the one or more cameras, based on the one or more initial camera parameters corresponding to the one or more cameras,
wherein the one or more cameras include two cameras,
the camera parameter calculator calculates the one or more camera parameters on the basis of a plurality of difference values, and
each of the plurality of difference values is an absolute value of a difference between:
a pixel value at a corresponding point, for one three-dimensional point from among the plurality of three-dimensional points, in a first image captured by a first camera included in the two cameras; and a pixel value at a corresponding point, for the one three-dimensional point, in a second image captured by a second camera included in the two cameras.

4. A recording medium provided with a control program for causing a device provided with a processor to execute processing, the recording medium being nonvolatile and computer-readable, and the processing including:
  obtaining three-dimensional point group data indicating three-dimensional coordinates of a plurality of three-dimensional points included in a common imaging space of one or more cameras;
  calculating image coordinates of corresponding points, for each of the plurality of three-dimensional points, in one or more images captured using the one or more cameras, based on the three-dimensional point group data and one or more initial camera parameters of the one or more cameras;
  calculating one or more camera parameters of the one or more cameras, based on pixel values, included in the one or more images, at the image coordinates; and
  outputting the one or more camera parameters,
  wherein the one or more cameras and the one or more initial camera parameters are in one-to-one relationship, the one or more cameras and the one or more images are in one-to-one relationship, and the one or more cameras and the one or more camera parameters are in one-to- one relationship,
  wherein calculation of the image coordinates includes the camera parameter calculator converting the plurality of three-dimensional coordinates into the image coordinates in the one or more images corresponding to the one or more cameras, based on the one or more initial camera parameters corresponding to the one or more cameras,
  wherein the one or more cameras include two cameras,
  the camera parameter calculator calculates the one or more camera parameters on the basis of a plurality of difference values, and
  each of the plurality of difference values is an absolute value of a difference between:
  a pixel value at a corresponding point, for one three-dimensional point from among the plurality of three-dimensional points, in a first image captured by a first camera included in the two cameras; and
  a pixel value at a corresponding point, for the one three-dimensional point, in a second image captured by a second camera included in the two cameras.

5. A camera parameter calculation method, including:
  obtaining three-dimensional point group data indicating three-dimensional coordinates of a plurality of three-dimensional points included in a common imaging space of one or more cameras;
  calculating image coordinates of corresponding points, for each of the plurality of three-dimensional points, in one or more images captured using the one or more cameras, based on the three-dimensional point group data and one or more initial camera parameters of the one or more cameras;
  calculating one or more camera parameters of the one or more cameras, based on pixel values, included in the one or more images, at the image coordinates; and
  outputting the one or more camera parameters,
  wherein the one or more cameras and the one or more initial camera parameters are in one-to-one relationship, the one or more cameras and the one or more images are in one-to-one relationship, and the one or more cameras and the one or more camera parameters are in one-to- one relationship,
  wherein calculation of the image coordinates includes the camera parameter calculator converting the plurality of three-dimensional coordinates into the image coordinates in the one or more images corresponding to the one or more cameras, based on the one or more initial camera parameters corresponding to the one or more cameras,
  wherein the one or more cameras include two cameras,
  the camera parameter calculator calculates the one or more camera parameters on the basis of a plurality of difference values, and
  each of the plurality of difference values is a square value of a difference between:
  a pixel value at a corresponding point, for one three-dimensional point from among the plurality of three-dimensional points, in a first image captured by a first camera included in the two cameras; and
  a pixel value at a corresponding point, for the one three-dimensional point, in a second image captured by a second camera included in the two cameras.

6. A recording medium provided with a control program for causing a device provided with a processor to execute processing, the recording medium being nonvolatile and computer-readable, and the processing including:
  obtaining three-dimensional point group data indicating three-dimensional coordinates of a plurality of three-dimensional points included in a common imaging space of one or more cameras;
  calculating image coordinates of corresponding points, for each of the plurality of three-dimensional points, in one or more images captured using the one or more cameras, based on the three-dimensional point group data and one or more initial camera parameters of the one or more cameras;
  calculating one or more camera parameters of the one or more cameras, based on pixel values, included in the one or more images, at the image coordinates; and
  outputting the one or more camera parameters,
  wherein the one or more cameras and the one or more initial camera parameters are in one-to-one relationship, the one or more cameras and the one or more images are in one-to-one relationship, and the one or more cameras and the one or more camera parameters are in one-to- one relationship,
  wherein calculation of the image coordinates includes the camera parameter calculator converting the plurality of three-dimensional coordinates into the image coordinates in the one or more images corresponding to the one or more cameras, based on the one or more initial camera parameters corresponding to the one or more cameras,
  wherein the one or more cameras include two cameras,
  the camera parameter calculator calculates the one or more camera parameters on the basis of a plurality of difference values, and
  each of the plurality of difference values is a square value of a difference between:
  a pixel value at a corresponding point, for one three-dimensional point from among the plurality of three-dimensional points, in a first image captured by a first camera included in the two cameras; and a pixel value at a corresponding point, for the one three-dimensional point, in a second image captured by a second camera included in the two cameras.

\* \* \* \* \*